(12) United States Patent
Bidner et al.

(10) Patent No.: US 6,490,856 B2
(45) Date of Patent: Dec. 10, 2002

(54) CONTROL FOR IMPROVED VEHICLE PERFORMANCE

(75) Inventors: David Karl Bidner, Livonia, MI (US); Gopichandra Surnilla, West Bloomfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/164,791

(22) Filed: Jun. 7, 2002

(65) Prior Publication Data

US 2002/0152741 A1 Oct. 24, 2002

Related U.S. Application Data

(63) Continuation of application No. 09/527,714, filed on Mar. 17, 2000.

(51) Int. Cl.[7] .................................................. F01N 3/00
(52) U.S. Cl. .............................. 60/274; 60/285; 60/295
(58) Field of Search .......................... 60/274, 285, 277, 60/295, 297, 301

(56) References Cited

U.S. PATENT DOCUMENTS

| | | | |
|---|---|---|---|
| 3,696,618 A | 10/1972 | Boyd et al. | |
| 3,969,932 A | 7/1976 | Rieger et al. | |
| 4,033,122 A | 7/1977 | Masaki et al. | |
| 4,036,014 A | 7/1977 | Ariga | |
| 4,178,883 A | 12/1979 | Herth | |
| 4,251,989 A | 2/1981 | Norimatsu et al. | |
| 4,622,809 A | 11/1986 | Abthoff et al. | |
| 4,854,123 A | 8/1989 | Inoue et al. | |
| 4,884,066 A | 11/1989 | Miyata et al. | |
| 4,913,122 A | 4/1990 | Uchida et al. | |
| 4,964,272 A | 10/1990 | Kayanuma | |
| 5,009,210 A | 4/1991 | Nakagawa et al. | |
| 5,088,281 A | 2/1992 | Izutani et al. | |
| 5,097,700 A | 3/1992 | Nakane | |
| 5,165,230 A | 11/1992 | Kayanuma et al. | |

(List continued on next page.)

FOREIGN PATENT DOCUMENTS

| | | |
|---|---|---|
| DE | 196 07 151 C1 | 7/1997 |
| EP | 0 351 197 A2 | 1/1990 |
| EP | 0 351 197 A1 | 1/1990 |

(List continued on next page.)

OTHER PUBLICATIONS

W.H. Holl, "Air Fuel Control to Reduce Emissions I. Engine–Emissions Relationships", SAE 800051, Feb. 25–29, 1980.

(List continued on next page.)

Primary Examiner—Thomas Denion
Assistant Examiner—Diem Tran
(74) Attorney, Agent, or Firm—Allan J. Lippa; John D. Russell

(57) ABSTRACT

An engine control system for managing lean $NO_x$ trap decontamination uses associated fuel economy impacts to determine when decontamination is enabled. In particular, a maximum achievable benefit provided by lean operation with a decontaminated $NO_x$ trap, a present fuel economy benefit being provided by lean operation, and a fuel economy penalty for performing decontamination are used. When a resulting benefit is greater than a penalty, decontamination is enabled.

28 Claims, 22 Drawing Sheets

U.S. PATENT DOCUMENTS

| | | |
|---|---|---|
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,377,484 A | 1/1995 | Shimizu |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,433,074 A | 7/1995 | Seto et al. |
| 5,437,153 A | 8/1995 | Takeshima et al. |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,544,482 A | 8/1996 | Matsumoto et al. |
| 5,626,014 A | 5/1997 | Hepburn et al. |
| 5,626,117 A | 5/1997 | Wright et al. |
| 5,713,199 A | 2/1998 | Takeshima et al. |
| 5,715,679 A | 2/1998 | Asanuma et al. |
| 5,722,236 A | 3/1998 | Cullen et al. |
| 5,771,685 A | 6/1998 | Hepburn |
| 5,771,686 A | 6/1998 | Pischinger et al. |
| 5,778,666 A | 7/1998 | Cullen et al. |
| 5,802,843 A | 9/1998 | Kurihara et al. |
| 5,803,048 A | 9/1998 | Yano et al. |
| 5,832,722 A | 11/1998 | Cullen et al. |
| 5,938,715 A | 8/1999 | Zang et al. |
| 5,974,788 A | 11/1999 | Hepburn et al. |
| 5,974,791 A | 11/1999 | Hirota et al. |
| 6,021,638 A * | 2/2000 | Hochmuth .......... 123/326 |
| 6,105,365 A * | 8/2000 | Deeba et al. ......... 60/274 |
| 6,202,407 B1 | 3/2001 | Brusasco et al. |
| 6,216,448 B1 * | 4/2001 | Schnaibel et al. ....... 60/274 |
| 6,263,666 B1 * | 7/2001 | Kubo et al. ........... 60/277 |
| 6,269,634 B1 * | 8/2001 | Yokota et al. ......... 123/300 |

FOREIGN PATENT DOCUMENTS

| | | |
|---|---|---|
| EP | 0 444 783 A1 | 9/1991 |
| EP | 0 503 882 A1 | 9/1992 |
| EP | 0 580 389 A1 | 1/1994 |
| JP | 62-97630 | 5/1987 |
| JP | 62-117620 | 5/1987 |
| JP | 64-53042 | 3/1989 |
| JP | 2-33408 | 2/1990 |
| JP | 3-30915 | 2/1990 |
| JP | 2-207159 | 8/1990 |
| JP | 3-135147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| JP | 7-166851 | 6/1995 |
| WO | 98/27322 | 6/1998 |

OTHER PUBLICATIONS

Wei–Ming Wang, "Air–Fuel Control to Reduce Emissions, II. Engine–Catalyst Characterization Under Cyclic Conditions", SAE 800052, Feb. 25–29, 1980.

Christopher D. De Boer et al., "Engineered Control Strategies for Improved Catalytic Control of $NO_x$ in Lean Burn Applications", SAE 881595, Oct. 10–13, 1988.

"An Air/Fuel Algorithm To Improve The NOx Conversion of Copper–Based Catalysts", by Joe Theis et al, SAE Technical Paper No. 922251, Oct. 19–22, 1992, pp. 77–89.

"Effect of Air–Fuel Ratio Modulation on Conversion Efficiency of Three–Way Catalysts", By Y. Kaneko et al., Inter–Industry Emission Control Program 2 (IIEC–2) Progress Report No. 4, SAE Technical Paper No. 780607, Jun. 5–9, 1978, pp. 119–127.

"Engineered Control Strategies For Improved Catalytic Control of NOx in Lean Burn Applications", by Alan F. Diwell, SAE Technical Paper No. 881595, 1988, pp. 1–11.

* cited by examiner

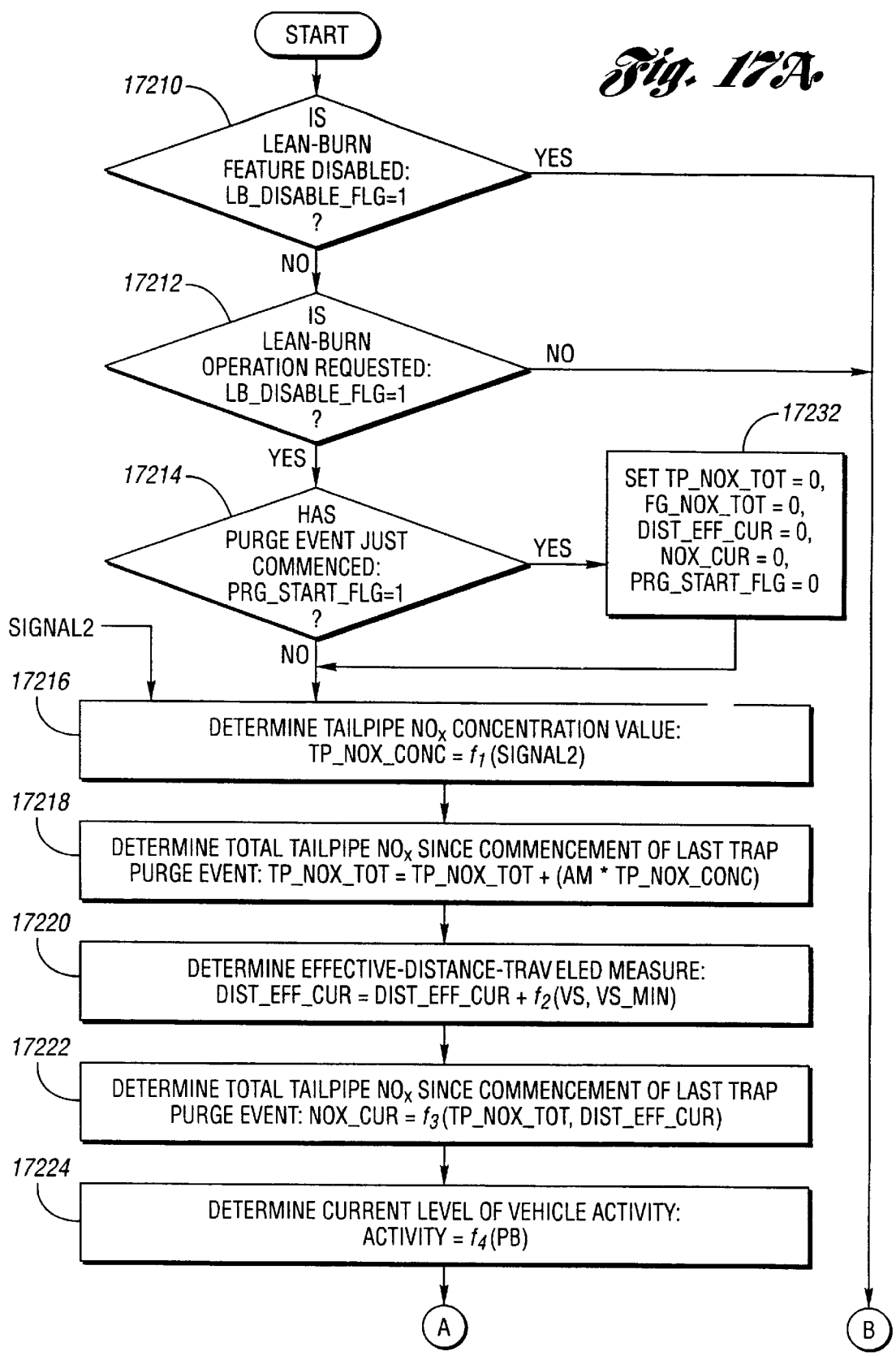

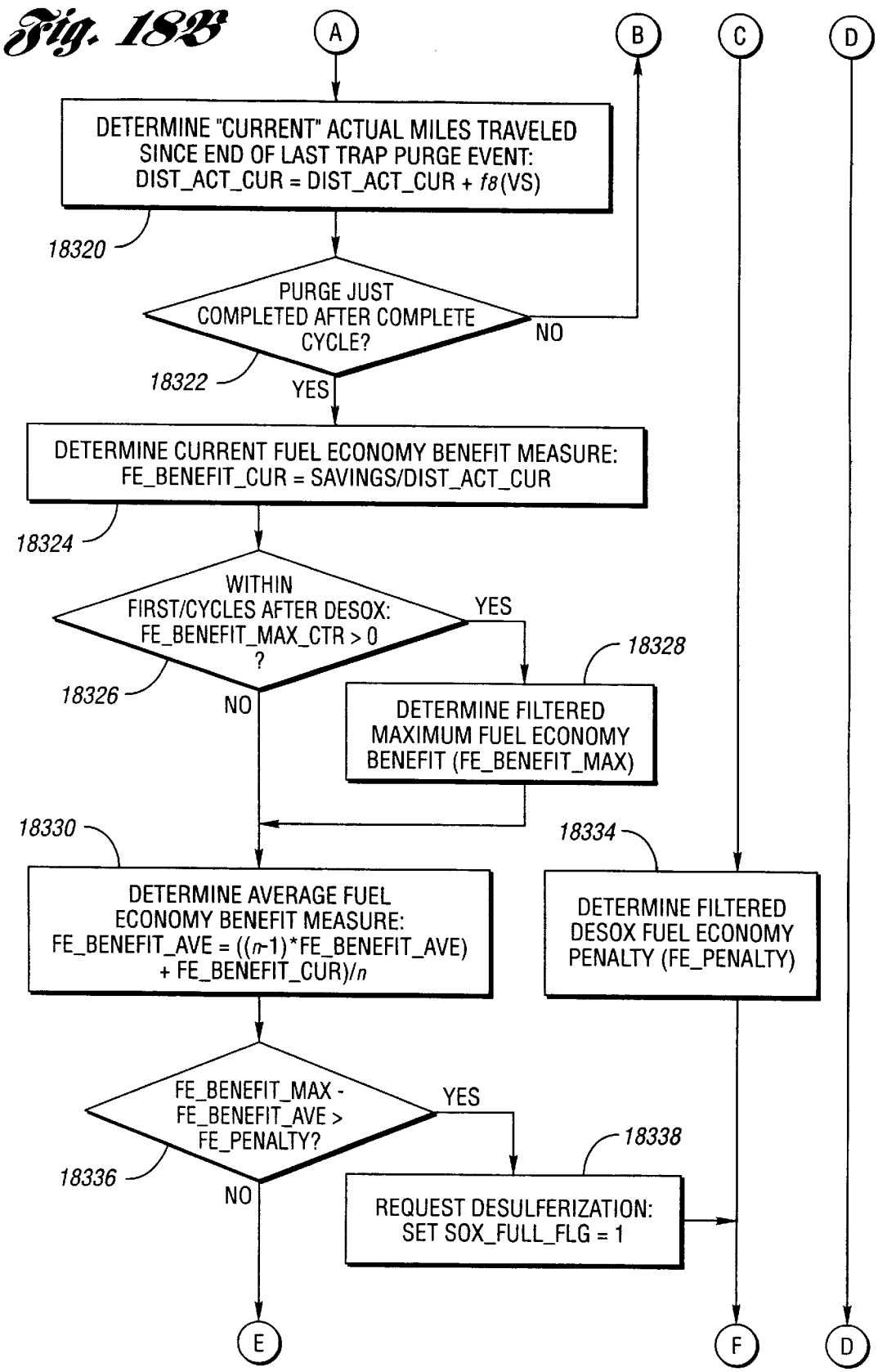

CONTROL FOR IMPROVED VEHICLE PERFORMANCE

This application is a continuation application of U.S. Ser. No. 09/527,714, filed Mar. 17, 2000, which is incorporated herein by reference in its entirety, and having the same assignee as the present application.

FIELD OF THE INVENTION

The invention relates to a system and method for controlling an internal combustion engine coupled to an emission control device.

BACKGROUND OF THE INVENTION

In direct injection spark ignition engines, the engine operates at or near wide-open throttle during stratified air-fuel ratio operation in which the combustion chambers contain stratified layers of different air-fuel ratio mixtures. Strata closest to the spark plug contain a stoichiometric mixture or a mixture slightly rich of stoichiometry, and subsequent strata contain progressively leaner mixtures. The engine may also operate in a homogeneous mode of operation with a homogeneous mixture of air and fuel generated in the combustion chamber by early injection of fuel into the combustion chamber during its intake stroke. Homogeneous operation may be either lean of stoichiometry, at stoichiometry, or rich of stoichiometry.

Direct injection engines are also coupled to emission control devices known as three-way catalytic converters optimized to reduce CO, HC, and $NO_x$. When operating at air-fuel ratio mixtures lean of stoichiometry, a three way catalyst optimized for $NO_x$ storate, known as a $NO_x$ trap or catalyst, is typically coupled downstream of the first three-way catalytic converter.

During lean, rich, and stoichiometric operation, sulfur contained in the fuel can become trapped in the emission control device in the form of $SO_x$. This gradually degrades emission control device capacity for storing $NO_x$, as well as emission control device efficiency. To counteract sulfur effects, various sulfur decontamination methods are available.

One method for determining degradation of a $NO_x$ trap due to sulfur contamination uses an estimate of $NO_x$ trap capacity, or a $NO_x$ absorption amount. In particular, $NO_x$ trap capacity is estimated by completely saturating the trap with $NO_x$ and then calculating an amount of $NO_x$ stored from fuel used to purge stored $NO_x$. Such a method is disclosed in EP 732 250.

The inventors herein have recognized numerous disadvantages if trap capacity is used to determine when to perform a decontamination cycle. In particular, such an approach may request decontamination cycles too often, thereby degrading fuel economy since there is a fuel penalty for performing decontamination cycles. In other words, known methods for performing decontamination cycles require a certain fuel amount to generate heat and raise temperature. This fuel amount does not contribute to motive force and thereby can degrade vehicle fuel economy.

Similarly, such an approach may request decontamination cycles too infrequently. Such operation also degrades fuel economy since more frequent fill and purge cycles will be necessary to meet regulated emissions. In other words, contamination results is lower capacity and less fuel efficient $NO_x$ purging, which can decreases overall fuel economy.

Another method for determining when to perform decontamination cycles uses an estimation scheme. In this approach, an amount of $SO_x$ stored in the $NO_x$ trap is estimated based on operating conditions. For example, an amount of $SO_x$ stored is estimated based on driving distance. In another example, the amount of stored $SO_x$ is estimated based on engine operating conditions. Then, when the estimated amount of stored $SO_x$ reaches a predetermined value, the decontamination cycle is performed. Such a method is described in U.S. Pat. No. 5,657,625.

The inventors herein have recognized a disadvantage with the above approach. In particular, depending on the setting of the predetermined value, fuel economy will be significantly affected. For example, if the value is set too high, decontamination cycles will be too frequent. With too frequent decontamination, fuel economy will be degraded since fuel is too often spent to perform decontamination. Similarly, with too infrequent decontamination, fuel economy may be degraded since fill and purge cycles will be inefficient.

SUMMARY OF THE INVENTION

An object of the invention claimed herein is to provide a method for enabling emission control device decontamination cycles.

The above object is achieved, and disadvantages of prior approaches overcome, by a method for controlling an engine coupled to an emission control device susceptible to reversible contamination, the engine capable of operating at a first operating condition and a second operating condition, the method comprising determining an impact of operating the engine at the first operating condition compared to operating the engine at the second operating condition, and performing a decontamination cycle in response to at least said impact, wherein said decontamination cycle reduces the reversible contamination.

By enabling emission control device decontamination cycles based on impacts of different operating conditions, it is possible to determine whether performing decontamination cycles will improve, degrade, or have minimal impact on vehicle performance. In other words, it may be the case that performing decontamination will allow longer lean operation and therefore improved fuel economy. However, it may also be the case that the act of performing decontamination will degrade fuel economy greater than any gains by longer lean operation, thereby giving degraded fuel economy. The present invention allows improved operation to overcome these obstacles.

An advantage of the above aspect of the present invention is improved fuel economy without degrading emission performance.

In another aspect of the present invention, the above object is achieved and disadvantages of prior approaches overcome by a method for controlling an engine coupled to an emission control device, the engine capable of operating at a first operating condition and a second operating condition, the method comprising determining a fuel savings of operating the engine at the first operating condition; determining a fuel loss of operating the engine at the second operating condition; and enabling one of the first operating condition and the second operating condition based on said fuel savings and said fuel loss.

By considering both a fuel loss and a fuel savings, it is possible to determine whether to enable operating conditions so that optimal fuel economy is obtained. For example, when lean operation is the first operating condition and a decontamination cycle is the second operating condition, if the fuel loss is greater than the potential fuel savings, then a decontamination cycle may not be justified.

An advantage of the above aspect of the present invention is improved fuel economy without degrading emission performance.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF THE INVENTION

Figure 1:
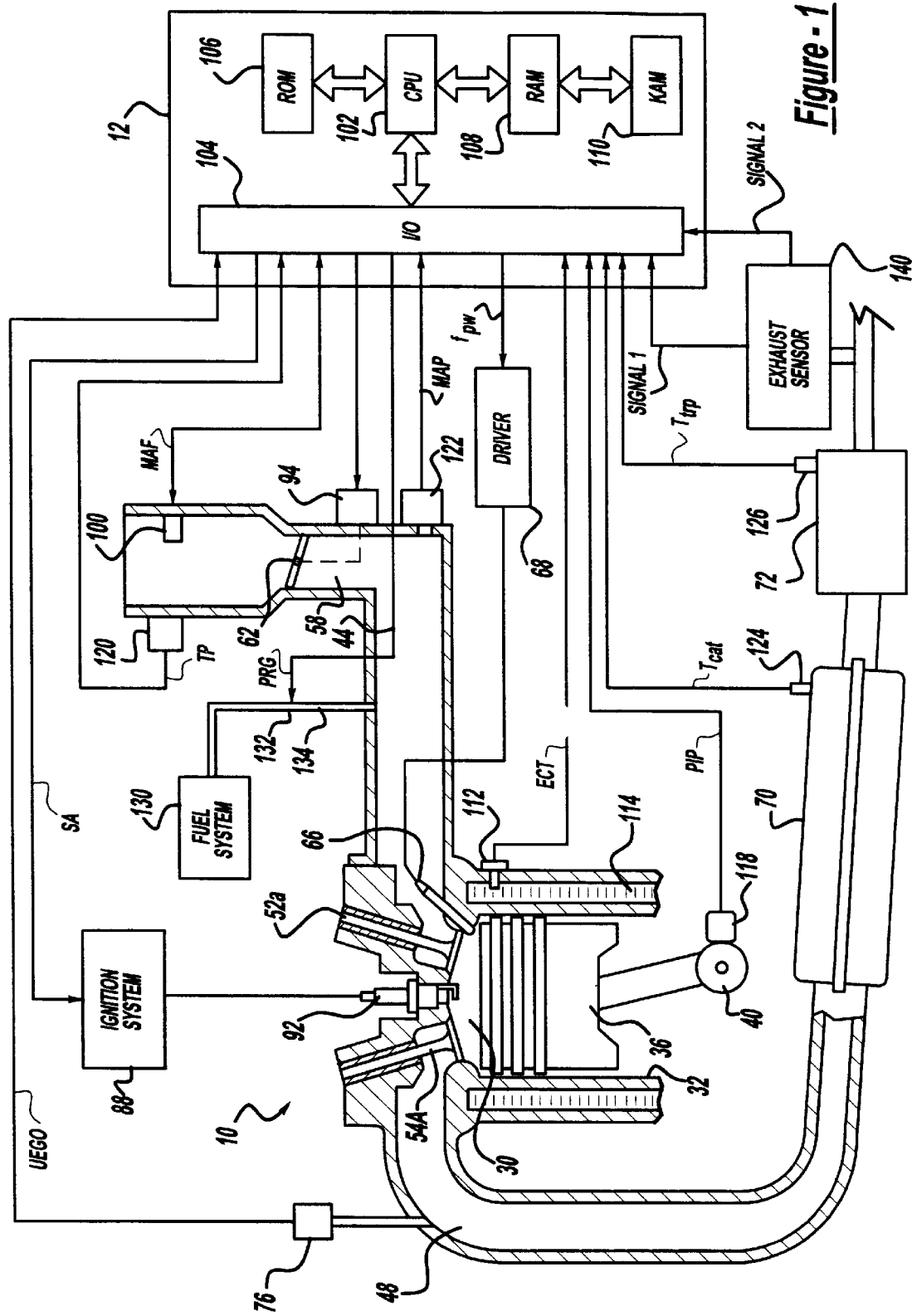
FIGS. 1–2 are block diagrams of an embodiment wherein the invention is used to advantage.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal UEGO to controller 12, which converts signal UEGO into a relative air-fuel ratio $\lambda$. Signal UEGO is used to advantage during feedback air-fuel ratio control in a manner to maintain average air-fuel ratio at a desired air-fuel ratio as described later herein. In an alternative embodiment, sensor 76 can provide signal EGO (not shown), which indicates whether exhaust air-fuel ratio is either lean of stoichiometry or rich of stoichiometry.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel ratio layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air-fuel ratio mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Nitrogen oxide ($NO_x$) absorbent or trap 72 is shown positioned downstream of catalytic converter 70. $NO_x$ trap 72 absorbs $NO_x$ when engine 10 is operating lean of stoichiometry. The absorbed $NO_x$ is subsequently reacted with HC and catalyzed during a $NO_x$ purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrp of $NO_x$ trap 72 are inferred from engine operation as disclosed in U.S. Pat. No. 5,414,994, the specification of which is incorporated herein by reference. In an alternate embodiment, temperature Tcat is provided by temperature sensor 124 and temperature Ttrp is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a sensor that produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where $NO_x$ is decomposed and measured by a second pumping current using the predetermined level. Nitrogen oxide concentration can then be indicated based on this second pumping current.

In one aspect of the present invention, a determination of degradation of the nitrogen oxide concentration measurement can be made if it is determined that the exhaust air-fuel ratio measurement is degraded. This is because nitrogen oxide concentration is not accurately detected in the second chamber unless the first chamber controls oxygen partial pressure properly. In other words, if it is determined that operation of the first chamber (where partial pressure of oxygen is measured) is degraded, then it is possible to determine that the second signal (SIGNAL2) indicating nitrogen oxide concentration is degraded as described later herein with particular reference to FIG. 13.

Figure 2:
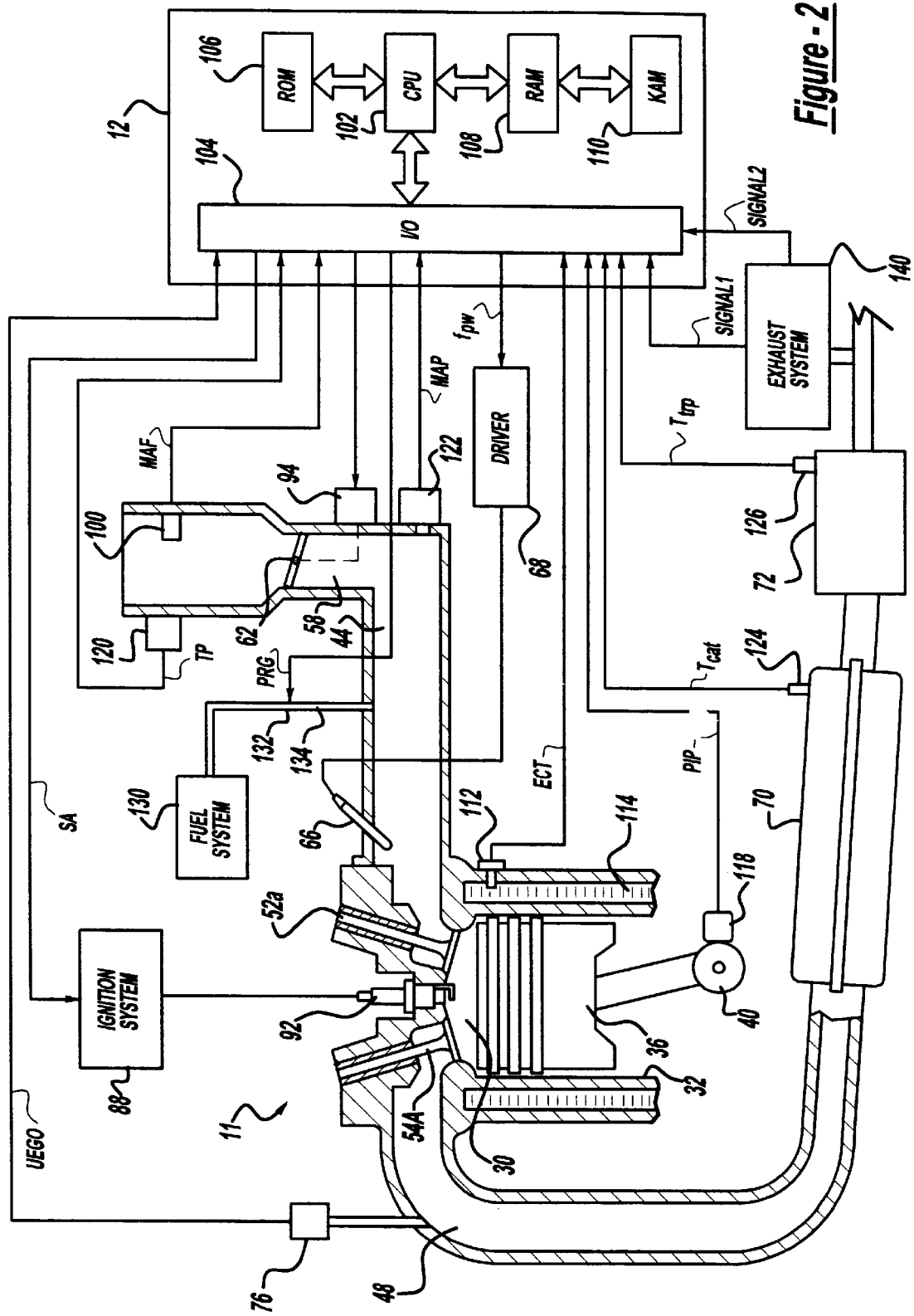

Referring now to FIG. 2, a port fuel injection engine 11 is shown where fuel is injected through injector 66 into intake manifold 44. Engine 11 is operated homogeneously substantially at stoichiometry, rich of stoichiometry, or lean of stoichiometry. Fuel is delivered to fuel injector 66 by a conventional fuel system (not shown) including a fuel tank, fuel pumps, and a fuel rail.

Those skilled in the art will recognize, in view of this disclosure, that the methods of the present invention can be used to advantage with either port fuel injected or directly injected engines.

Figure 3:
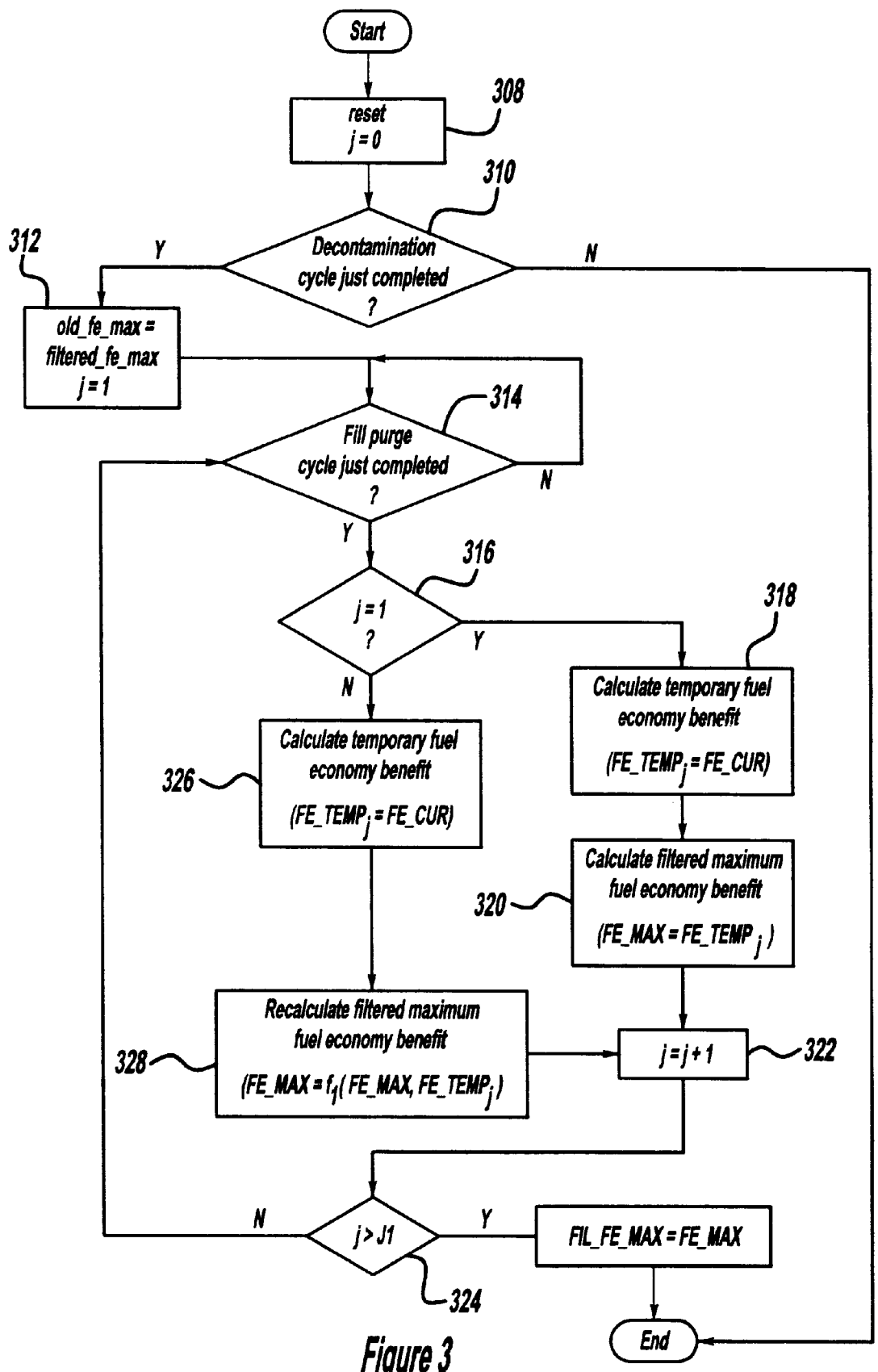
FIGS. 3–15 are high level flow charts of various operations performed by a portion of the embodiment shown in FIG. 1.
Figure 4:
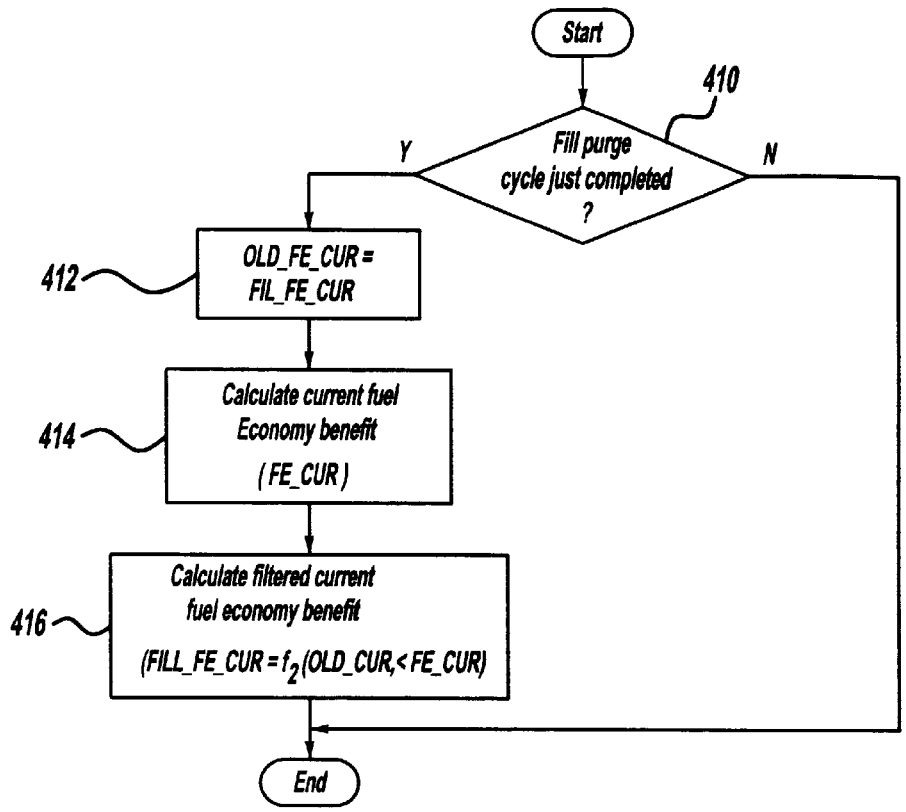
Figure 5:
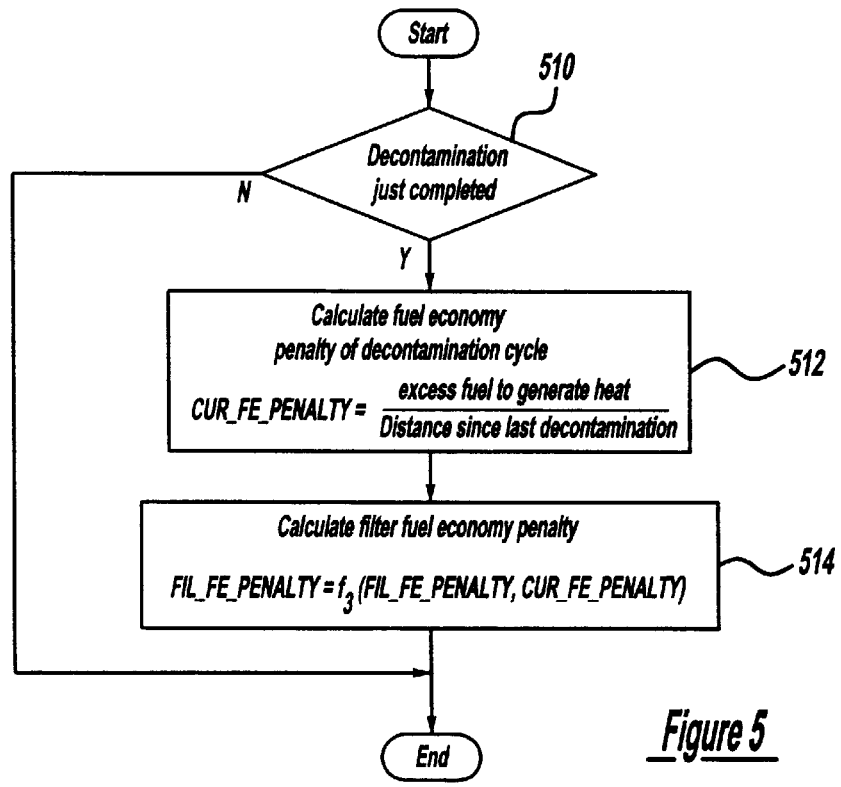

Referring now to FIGS. 3–5, routines for determining performance impacts of operating in various engine operating conditions are described. In a preferred embodiment, performance impact is a fuel economy percentage impact over stoichiometric operation. The impact can be a benefit, where fuel is saved over stoichiometric operation, or a fuel loss. In other words, the following routines determine fuel economy saved relative to stoichiometric operation or fuel economy lost relative to stoichiometric operation. However, those skilled in the art will recognize in view of this disclosure various other performance impacts that can be used to compare different operation modes such as, for example, fuel usage impact, fuel efficiency impact, fuel savings, fuel loss, engine efficiency impact, fuel savings per distance traveled by the vehicle, or a drivability impact.

Referring now specifically to FIG. 3, a routine is described for determining a maximum fuel economy benefit that can be provided when operating lean, assuming that emission control device 72 has been decontaminated. More specifically in a preferred embodiment, that a sulfur decontamination has been completed. In other words, the routine determines the maximum potential fuel economy benefit that can be provided after performing a decontamination cycle. First, in step 308, counter j is reset equal to zero. Next, in step 310, a determination is made as to whether a decontamination cycle has just been completed. A decontamination cycle, as described herein, refers to any operating cycle where engine operating conditions are changed to remove a contaminant. For example, a sulfur decontamination cycle where exhaust gas temperature is raised and the engine is operated substantially at or rich of stoichiometry to remove sulfur contaminating emission control device 72 is one such decontamination cycle. When the answer to step 310 is YES, the routine continues to step 312 where parameter OLD_FE_MAX is set equal to parameter FILTERED_FE_MAX. Also, in step 312, counter j is set equal to one. Counter j keeps track of the number of NOx fill/purge cycles after a decontamination cycle over which the maximum fuel economy benefit is average. Next, in step 314, a determination is made as to whether a $NO_x$ fill/purge cycle has just been completed. When the answer to step 314 is YES, a determination is made as to whether counter j equals one. When the answer to step 316 is YES, the routine continues to step 318. In step 318, the routine calculates temporary fuel economy benefit (FE_TEMP$_j$) based on current fuel economy benefit (FE_CUR), where current fuel economy benefit is calculated as described below. This temporary fuel economy benefit represents the fuel economy benefit averaged over a $NO_x$ fill/purge cycle that is achieved compared to operating the engine substantially at stoichiometry. Next, in step 320, maximum fuel economy benefit (FE_MAX) is calculated based on temporary fuel economy benefit. Next, in step 322, counter j is incremented. Next, in step 324, a determination is made as to whether counter j is greater than predetermined value J1. Predetermined value J1 represents the number of $NO_x$ fill/purge cycles after a decontamination cycle over which maximum fuel economy benefit, provided by lean operation relative to stoichiometric operation, is calculated. In a preferred embodiment, predetermined value J1 represents the number of $NO_x$ fill/purge cycles after a decontamination cycle over which maximum fuel economy benefit is averaged. This averaging allows variations in vehicle operating conditions to be accounted in determining maximum fuel economy benefit so that a representative value is obtained. When the answer to step 324 is YES, the filtered maximum fuel economy benefit (FIL_FE_MAX) is set equal to maximum fuel economy benefit.

Continuing with FIG. 3, when the answer to step 316 is NO, temporary fuel economy benefit (FE_TEMP$_j$) is calculated in step 326 based on current fuel economy benefit (FE_CUR). Current fuel economy benefit (FE_CUR) represents the current fuel economy benefit relative to stoichiometric operation provided by lean operation and is calculated based on operating conditions. In particular, as described in U.S. patent application Ser. No. 09/528,217, titled "METHOD AND APPARATUS FOR CONTROLLING LEAN-BURN ENGINE BASED UPON PREDICTED PERFORMANCE IMPACT", filed concurrently with the present application on Mar. 17, 2000, assigned to the same assignee as the present application, which is hereby expressly incorporated by reference, a performance impact is set as a percentage fuel economy benefit/loss associated with engine operation at a selected lean or rich operating condition relative to a reference stoichiometric operating condition at MBT, the controller 12 first determines whether the lean-burn feature is enabled. If the lean-burn feature is enabled as, for example indicated by the lean-burn running flag LB_RUNNING_FLG being equal to logical one, the controller 12 determines a first value TQ_LB representing an indicated torque output for the engine when operating at the selected lean or rich operating condition, based on its selected air-fuel ratio LAMBSE and the degrees DELTA_SPARK of retard from MBT of its selected ignition timing, and further normalized for fuel flow. Then, controller 12 determines a second value TQ_STOICH representing an indicated torque output for the engine 10 when operating with a stoichiometric air-fuel ratio at MBT, likewise normalized for fuel flow. In particular, TQ_LB is determined as a function of desired engine torque, engine speed, desired air-fuel ratio, and DELTA_SPARK. Further, TQ_STOICH is determined as a function of desired engine torque and engine speed. Next, the controller 12 calculates the lean-burn torque ratio TR_LB by dividing the first normalized torque value TQ_LB with the second normalized torque value TQ_STOICH.

Continuing, the controller 12 determines a value SAVINGS representative of the cumulative fuel savings to be achieved by operating at the selected lean operating condition relative to the reference stoichiometric operating condition, based upon the air mass value AM, the current (lean or rich) lean-burn air-fuel ratio (LAMBSE) and the determined lean-burn torque ratio TR_LB, wherein

SAVINGS=SAVINGS+(AM*LAMBSE*14.65*(1−TR)).

The controller 12 then determines a value DIST_ACT_CUR representative of the actual miles traveled by the vehicle since the start of the last trap purge or desulfurization event. While the "current" actual distance value DIST_ACT_CUR is determined in any suitable manner, in the exemplary system, the controller 14 determines the current actual distance value DIST_ACT_CUR by accumulating detected or determined instantaneous values VS for vehicle speed.

Because the fuel economy benefit to be obtained using the lean-burn feature is reduced by the "fuel penalty" of any associated trap purge event, in the exemplary system, the controller 12 determines the "current" value FE_CUR for fuel economy benefit only once per $NO_x$ fill cycle. And, because the purge event's fuel penalty is directly related to the preceding trap "fill," the current fuel economy benefit value FE_CUR is preferably determined at the moment that the purge event is deemed to have just been completed, as described below.

Continuing with FIG. 3, in step 328, maximum fuel economy benefit is calculated as a function ($f_1$) of maximum fuel economy benefit and temporary fuel economy benefit. In this way, the fuel economy benefit provided by a decontaminated emission control device is filtered over several $NO_x$ fill/purge cycles. In a preferred embodiment, the filtering is performed by a rolling average function of the form in the following equation where (fk) is a filter coefficient between zero and one. Those skilled in the art will recognize, in view of this disclosure, this as a single pole low pass filter.

output=(1−fk)output+(fk)input or, output=(1−fk)old_output+(fk)input, old_output=output Thus, according to the present invention, it is possible to determine the fuel economy benefit provided by a decontaminated emission control device.

Referring now to FIG. 4, a routine is described for determining the present, or current, fuel economy benefit that is being provided by operating lean of stoichiometry with the emission control device 72 in its present state, be it contaminated or decontaminated. First, in step 410, a determination is made as to whether a $NO_x$ fill/purge cycle has just been completed. When the answer to step 410 is YES, the routine continues to step 412 where parameter OLD_FE_CUR is set equal to parameter FIL_FE_CUR. Next, in step 414, the routine calculates the current fuel economy benefit (FE_CUR). Next, in step 416, the routine calculates the filtered current fuel economy benefit (FIL_FE_CUR) based on a filtered value of the current fuel economy benefit, and parameter OLD_FE_CUR. In other words, the current fuel economy benefit (FIL_FE_CUR) represents the fuel economy benefit that will be realized if the system continues to operate as it currently does and no decontamination is performed. Accordingly, (FIL_FE_CUR) is the fuel economy benefit that will be achieved by not performing a decontamination cycle.

In a preferred embodiment, function ($f_2$) represents the rolling average function described above herein. Thus, according to the present invention, a fuel economy benefit averaged over several $NO_x$ fill/purge cycle can be determined. This value can then be used to advantage in various ways since it indicates an on-line measure of the improved fuel economy performance provided by lean operation averaged to remove cycle-to-cycle variation.

Referring now to FIG. 5, a routine is described for determining a fuel economy penalty experienced by performing a decontamination cycle. More specifically, in a preferred embodiment, a decontamination cycle that removes $SO_x$. First, in step 510, a determination is made as to whether a decontamination cycle has just been completed. When the answer to step 510 is YES, the routine continues to step 512 where a fuel economy penalty is calculated. The current fuel economy penalty of the last decontamination cycle (CUR_FE_PENALTY) is calculated by dividing the excess fuel used to generate heat or the excess fuel used to operate in one condition compared to another condition by the distance between decontamination cycles. In other words, the penalty of performing a decontamination cycle is spread over the distance between two decontamination cycles. Next, in step 514, a filtered fuel economy penalty is calculated by filtering the current fuel economy penalty according to function ($f_3$) which, in a preferred embodiment, represents the rolling average function describe above herein. Thus, according to the present invention, it is possible to determine the fuel economy penalty experienced by performing a decontamination cycle. In an alternative embodiment, the fuel economy penalty to perform a decontamination cycle can be set to a predetermined value.

Those skilled in the art will recognize, in view of this disclosure, various alterations of the present invention that achieve a similar result. For example, the average excess fuel used during several decontamination cycles can be divided by the total distance between all of the decontamination cycles, thereby providing an averaged fuel economy penalty for performing a decontamination cycle.

In an alternate embodiment, fuel economy penalty to perform a decontamination cycle can be stored as a function of vehicle and/or engine operating parameters. For example, fuel economy penalty can be stored versus vehicle speed and exhaust gas temperature experienced before performing said decontamination cycle. Those skilled in the art will recognize, in view of this disclosure, various other factors that affect a fuel economy penalty to perform a decontamination cycle such as, for example, engine speed, mass air flow, manifold pressure, ignition timing, air-fuel ratio, exhaust gas recirculation amount, and engine torque.

In yet another embodiment, fuel economy penalty can be determined as now described. First, controller 12 updates a stored value DIST_ACT_DSX representing the actual distance that the vehicle has traveled since the termination or "end" of the immediately preceding desulfurization, or decontamination, event. Then, the controller 12 determines whether a desulfurization event is currently in progress. While any suitable method is used for desulfurizing the trap, an exemplary desulfurization event is characterized by operation of some of the engine's cylinders with a lean air-fuel mixture and other of the engine's cylinders with a rich air-fuel mixture, thereby generating exhaust gas with a slightly rich bias. Next, the controller 12 determines the corresponding fuel-normalized torque values TQ_DSX_LEAN and TQ_DSX_RICH, as a function of current operating conditions. In particular, TQ_DSX_LEAN and TQ_DSX_RICH are determined as functions of desired engine torque, engine speed, desired air-fuel ratio, and DELTA_SPARK. Then, the controller 12 further determines the corresponding fuel-normalized stoichiometric torque value TQ_STOICH as a function of desired engine torque and engine speed. The controller 12 then calculates a cumulative fuel economy penalty value, as follows:

PENALTY=PENALTY+(AM/2*LAMBSE*14.65*(1−TR_DSX_LEAN))+(AM/2*LAMBSE*14.65*(1−TR_DSX_RICH))

Then, the controller 12 sets a fuel economy penalty calculation flag to thereby ensure that the current desulfurization fuel economy penalty measure FE_PENALTY_CUR is determined immediately upon termination of the on-going desulfurization event.

If the controller 12 determines that a desulfurization event has just been terminated, the controller 12 then determines the current value FE_PENALTY_CUR for the fuel economy penalty associated with the terminated desulfurization event, calculated as the cumulative fuel economy penalty value PENALTY divided by the actual distance value DIST_ACT_DSX. In this way, the fuel economy penalty associated with a desulfurization event is spread over the actual distance that the vehicle has traveled since the immediately prior desulfurization event. Next, the controller 12 calculates a rolling average value FE_PENALTY of the last m current fuel economy penalty values FE_PENALTY_CUR to thereby provide a relatively-noise-insensitive measure of the fuel economy performance impact of such desulfurization events. The value FE_PENALTY can be used in place of value FIL_FE_PENALTY. By way of example only, the average negative performance impact or "penalty" of desulfurization typically ranges between about 0.3 percent to about 0.5 percent of the performance gain achieved through lean-burn operation. Finally, the controller 23 resets the fuel economy penalty calculation flag FE_PNLTY_CALC_FLG, along with the previously determined (and summed) actual distance value DIST_ACT_DSX and the current fuel economy penalty value PENALTY, in anticipation for the next desulfurization event.

Figure 6:
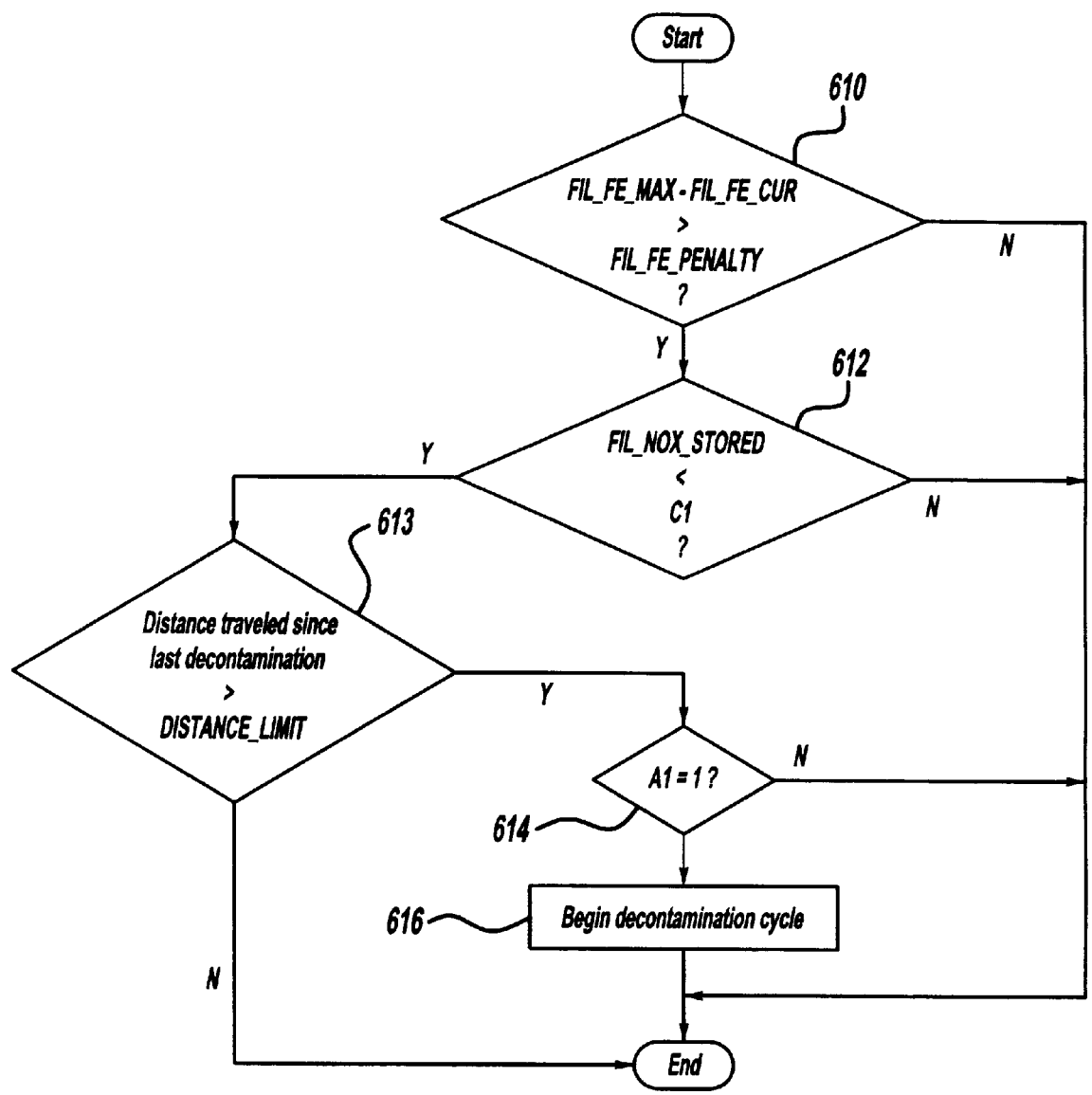

Referring now to FIG. 6, a routine is described for determining whether to commence, or begin, a decontamination cycle. First, in step 610, a determination is made as to whether the maximum potential fuel economy benefit provided a decontaminated emission control device minus the current fuel economy benefit being provided by the decontamination cycle in its present condition is greater than the fuel economy penalty experienced by performing a decontamination cycle. In particular, the difference between parameter FIL_FE_MAX and parameter FIL_FE_CUR is compared to parameter FIL_FE_PENALTY. When the answer to step 610 is YES, the routine has determined that greater fuel economy can be provided by performing a decontamination cycle rather than continuing with operating the engine lean of stoichiometry and performing $NO_x$ fill/purge cycles. When the answer to step 610 is NO, the routine has determined that greater fuel economy can be provided by continuing operation in the present condition. In other words, operating with the emission control device in its present condition provides better fuel economy than attempting to improve operation of the emission control device by performing a decontamination cycle. Next, in step 612, a determination is made as to whether normalized $NO_x$ storage ability (FIL_NOX_STORED) of the emission control device is less than limit value Cl. Normalized stored $NO_x$ (FIL_NOX_STORED) is calculated as described later herein with particular reference to FIGS. 9 and 10. When the answer to step 612 is YES, the routine continues to step 613 where a determination is made as to whether vehicle distance traveled since the last decontamination cycle is greater than limit distance (DISTANCE_LIMIT). When the answer to step 613 is YES, the routine continues to step 614 where a determination is made as to whether parameter A1 is equal to one. Parameter A1 is determined based on vehicle activity as described later herein with particular reference to FIG. 7. When the answer to step 614 is YES a decontamination cycle is begun in step 616. The embodiment shown in FIG. 6 is that for the example of a port fuel injected engine. In an alternate embodiment, which can be used for direct injection engines, step 614 is eliminated. This is because in port fuel injected engines it is challenging to provide well controlled decontamination temperatures under all operating conditions. However, in a direct injection engine, since fuel can be injected during the exhaust stroke to heat the exhaust system, decontamination can be performed at almost any time.

Figure 7:
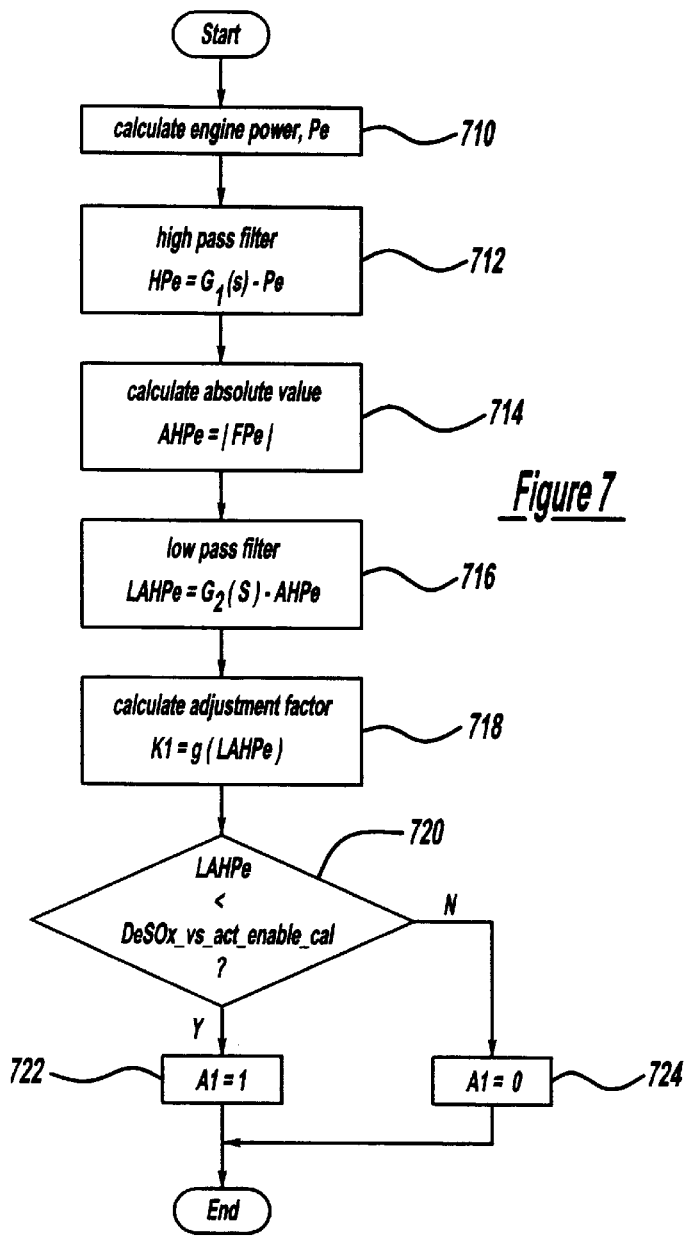

Referring now to FIG. 7, a routine is described for determining vehicle activity. First, in step 710, a the routine calculates engine power (Pe). In a preferred embodiment, this is the actual engine power, however, in a preferred embodiment, desired engine power can be used. Also, various other parameters can be used in place of engine power such as, for example, vehicle speed, engine speed, engine torque, wheel torque, or wheel power. Next, in step 712, engine power (Pe) is filtered with a high pass filter $G_1(s)$, where s is the Laplace operator known to those skilled in the art, to produce high pass filtered engine power (HPe). Next, in step 714, the absolute value (AHPe) of the pass filtered engine power (HPe) is calculated. In step 716, the absolute value (AHPe) is low pass filtered with filter $G_1(s)$ to produce signal (LAHPe). In step 718, adjustment factor K1 calculated as a predetermined function g of signal (LAHPe).

Then, in step 720, a determination is made as to whether signal (LAHPe) is less than the calibration parameter (DESOX_VS_ACT_ENABLE_CAL). When the answer to step 720 is YES, parameter A1 is set to one in step 722. Otherwise, value A1 is set to zero in step 724.

Figure 8:
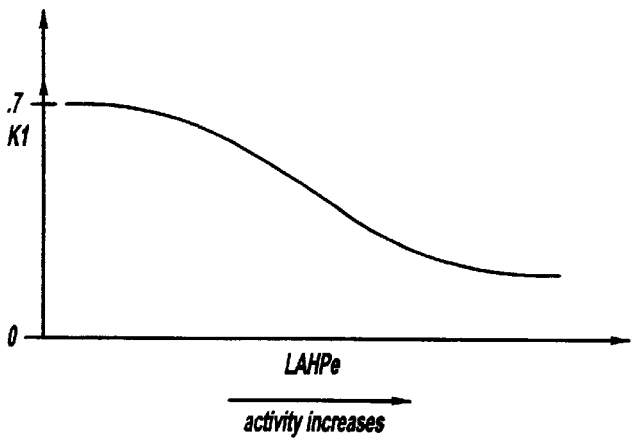

Referring now to FIG. 8, a graph of function g shows how adjustment factor K1 varies as a function of signal (LAHPe) in a preferred embodiment. As shown in the preferred embodiment, as vehicle activity increases, adjustment factor K1 is reduced. As vehicle activity decreases, adjustment factor K1 is increased to a maximum value of 0.7.

Figure 9:
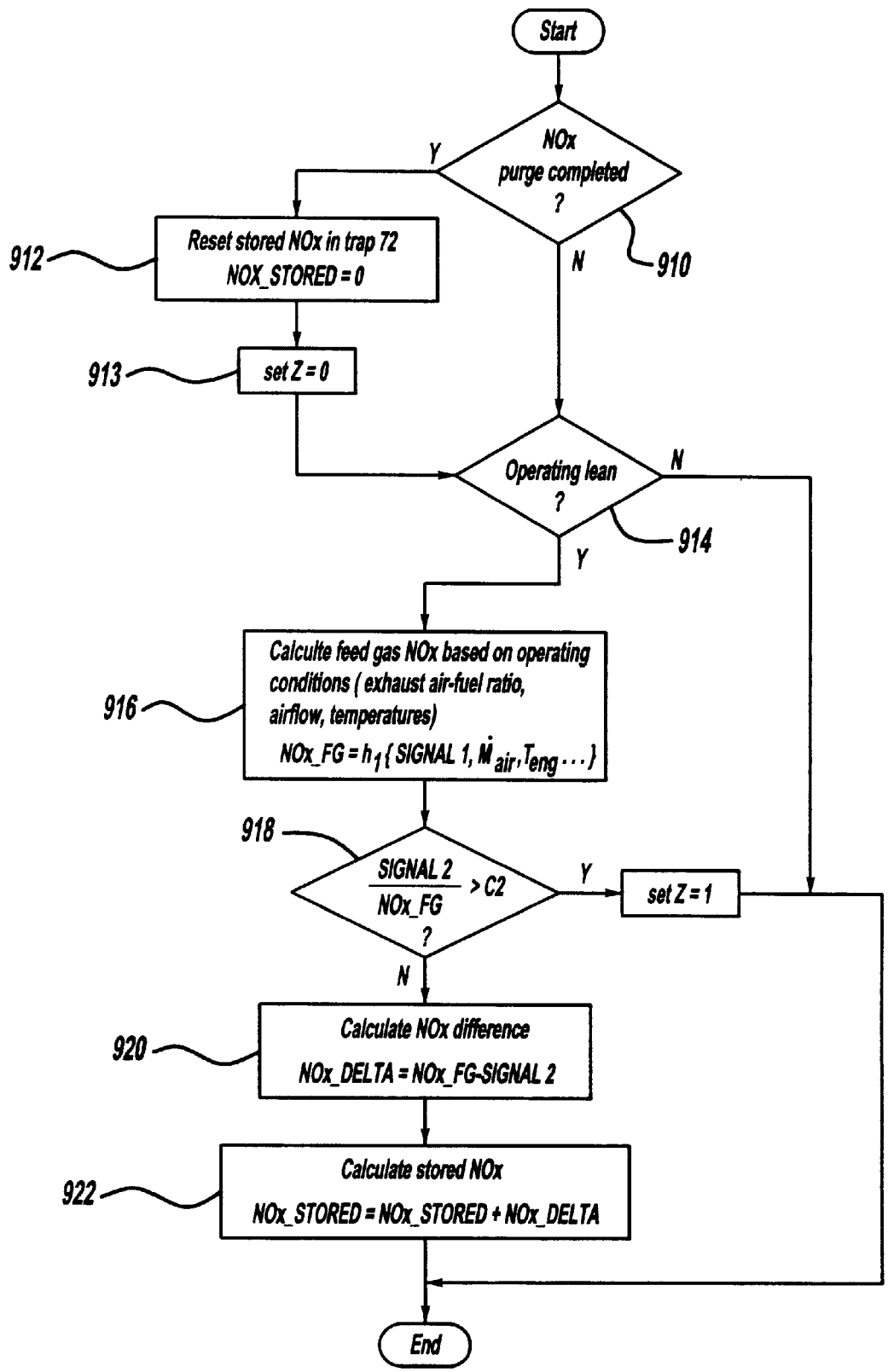
Figure 10:
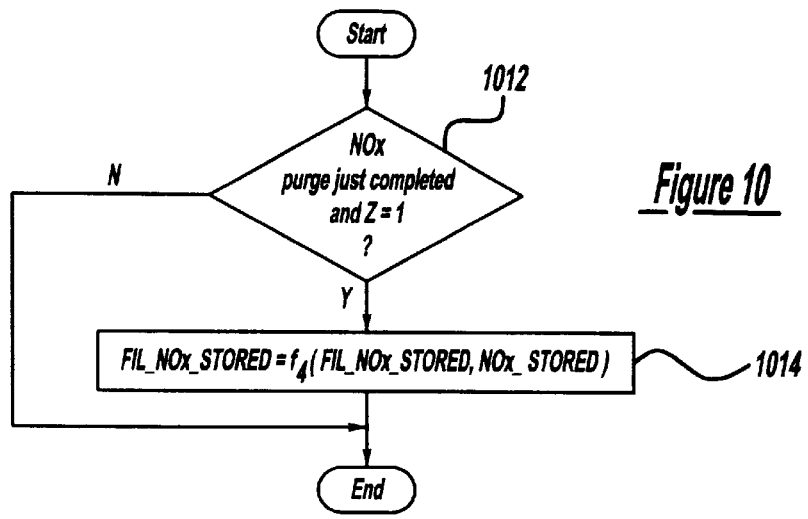

Referring now to FIGS. 9 and 10, a routine for determining $NO_x$ stored in an emission control device is described. In particular, the routine describes a method for determining a consistent measure of $NO_x$ stored that can be averaged over several $NO_x$ purge/fill cycles. First, in step 910, a determination is made as to whether a $NO_x$ purge has just been completed. In an alternate embodiment, an additional check as to whether lean operation has commenced can also be used. When the answer to step 910 is YES, $NO_x$ stored estimated (NOX_STORED) is reset to zero in step 912. In particular, the routine assumes that a complete $NO_x$ purge was completed and all stored $NO_x$ was removed. However, in an alternate embodiment, if only part of the $NO_x$ was purged, $NO_x$ stored in step 912 would be set to this partial value rather than zero. Next, in step 913, flag Z is set to zero to indicate that the stored $NO_x$ value is not fully estimated. Next, in step 914, a determination is made as to whether the engine is operating lean of stoichiometry. When the answer to step 914 is YES, the routine continues to step 916. In step 916, a calculation of feedgas $NO_x$ (NOX_FG) based on operating conditions is generated. In particular, feedgas $NO_x$ generated by the engine is calculated based on function (h1) using operating conditions such as, for example, SIGNAL1 (or desired air-fuel ratio of the engine), mass air flow (mair), engine temperature (TENG), and engine speed (RPM). This feedgas $NO_x$ can then be used to represent the $NO_x$ entering $No_x$ trap 72. Those skilled in the art will recognize, in view of this disclosure, that various additional factors can be used such as factors that account for a $NO_x$ storage or reduction due to activity of three-way catalyst 70.

Continuing with FIG. 9, in step 918, a determination is made as to whether the ratio of $NO_x$ exiting trap 72 to $NO_x$ entering trap 72 is greater than threshold C2. For example, threshold C2 can be set to 0.65. When t he answer to step 918 is NO, a $NO_x$ difference (NOX_DELTA) is calculated between $NO_x$ entering (NOX_FG) and $NO_x$ exiting (SIGNAL2) in step 920. Next, in step 922, an accumulated $NO_x$ storage (NOX_STORED) is determined by numerically summing $NO_x$ difference (NOX_DELTA). When the answer to step 918 is YES, flag Z is set to one to indicate that a consistent measure of $NO_x$ stored has been completed and fully estimated.

Referring now to FIG. 10, in step 1012, a determination is made as to whether a $NO_x$ purge has just been completed. When the answer to step 1012 is YES, the routine continues to step 1014. In step 1014, filtered normalized $NO_x$ stored (FIL_NOX_STORED) is calculated by filtering $NO_x$ stored (NOX_STORED) according to function ($f_4$) which, in a preferred embodiment, represents the rolling average function describe above herein.

Thus, according to the present invention, it is possible to calculate a value representing a consistent and normalized $NO_x$ storage value that can be used in determining degradation and determining whether to perform a decontamination cycle.

Figure 11:
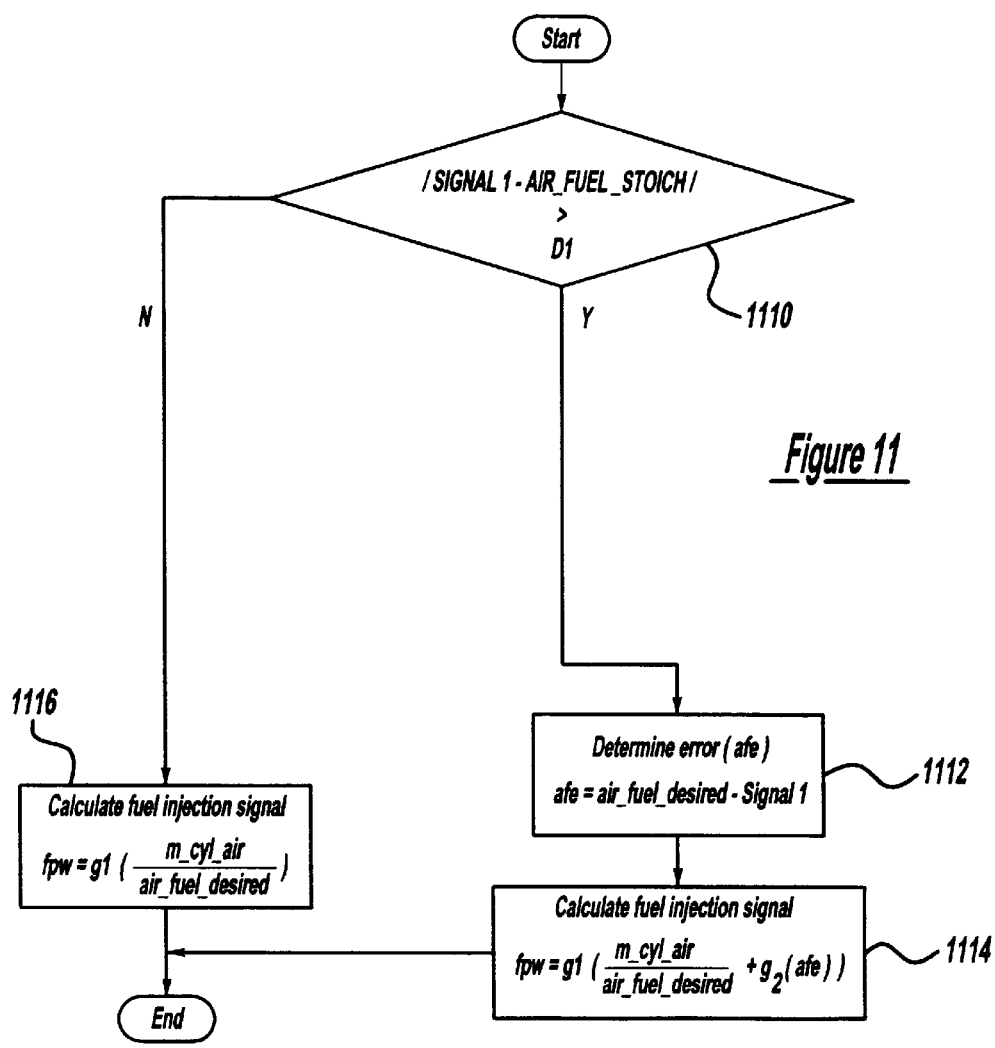

Referring now to FIG. 11, a routine is described for using first output signal (SIGNAL1) of sensor 140 for performing closed loop air-fuel ratio control. First, in step 1110, a determination is made as to whether the absolute value of the difference between SIGNAL1 and stoichiometric air-fuel ratio (air_fuel_stoich) is greater than a predetermined difference (D1). In other words, a determination is made as to whether the first output signal of exhaust sensor 140 is indicating an exhaust air-fuel ratio away from stoichiometry. When the answer to step 1110 is YES, the routine continues to step 1112. In step 1112, the routine determines an air-fuel error (afe) based on the difference between desired air-fuel ratio (air_fuel_desired) and the first output signal (SIGNAL1). Next, in step 1114, the routine generates fuel injection signal (fpw) based on the determined error (afe) and the cylinder charge (m_cyl_air) and desired air-fuel ratio (air_fuel_desired). In addition, function g2 is used to modify the air-fuel error (afe) and can represent various control functions such as, for example, a proportional, integral and derivative controller. Also, function g1 is used to convert the desired mass of fuel entering the cylinder into a signal that can be sent to fuel injector 66. Also, those skilled in the art will recognize, in view of this disclosure, that various other corrections involving information from other exhaust gas sensors can be used. For example, additional corrections from sensor 76 can be used.

When the step 1110 is NO, the routine continues to step 1116 and calculates fuel injection signal (fpw) based on the cylinder charge amount and the desired air-fuel ratio using function g1. Thus, according to the present invention, it is possible to improve open-loop fueling control using the first output of sensor 140, which is located downstream of $NO_x$ trap 72, whenever the first output signal indicates a value away from stoichiometry. In this way, $NO_x$ storage and oxygen storage, as well as $NO_x$ reduction, do not adversely closed-loop feedback air-fuel control using a sensor located downstream of a NOx trap.

Figure 12:
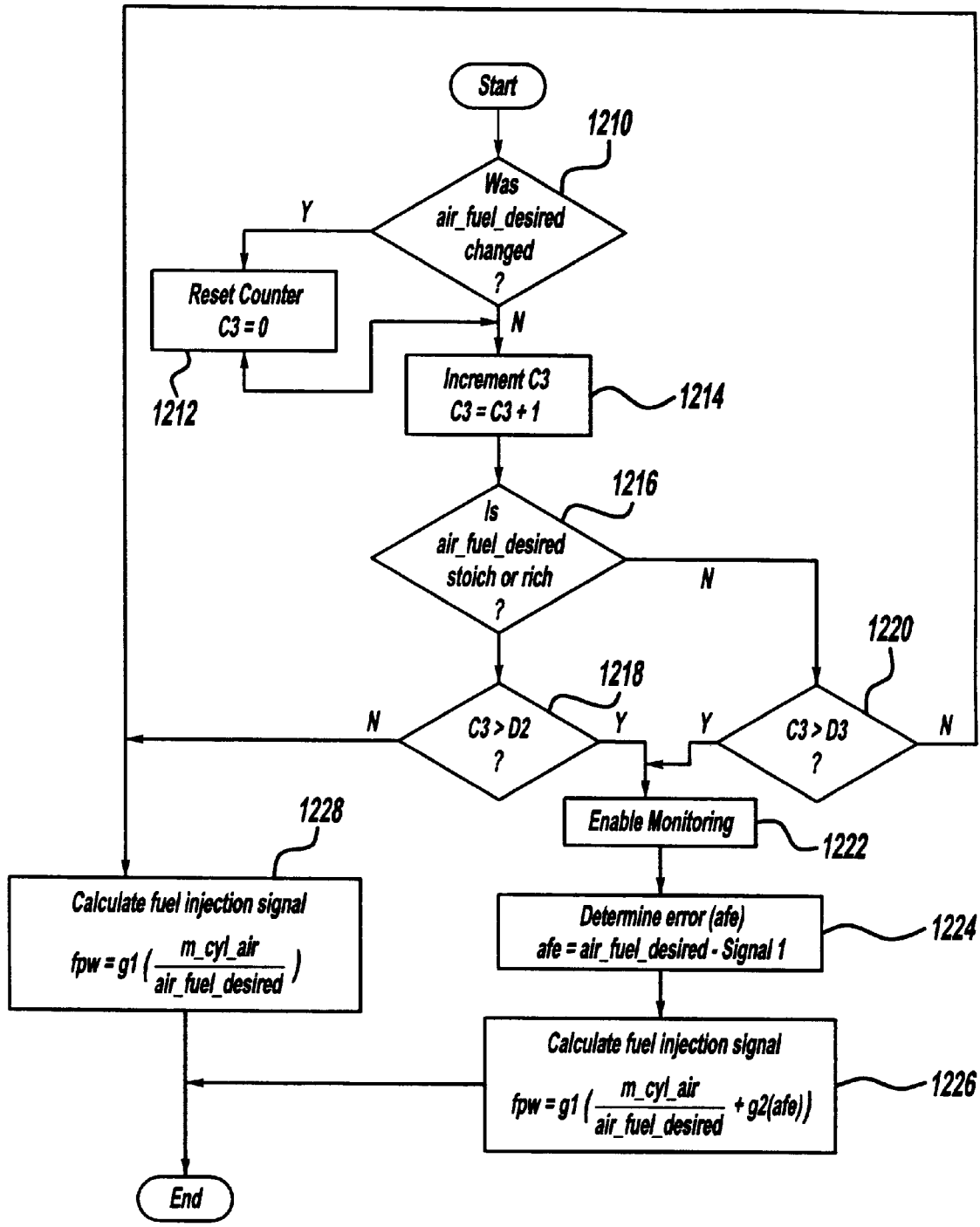

Referring now to FIG. 12, an alternate routine to that described in FIG. 11 is shown. In this alternate routine, various timers are used to gate out the first output of exhaust sensor 140 for use in feedback air-fuel ratio control whenever it is determined that one of the following conditions is present: oxygen is being stored in $NO_x$ trap 72, and/or nitrogen oxide is being released and reduced by a reducing constituent in the exhaust gas in $NO_x$ trap 72. Also, this alternate embodiment can be used to advantage to determine when to enable monitoring of exhaust sensor 140 as described later herein with particular reference to FIGS. 13 and 14.

Continuing with FIG. 12, in step 1210, a determination is made as to whether the desired air-fuel ratio (air_fuel_desired) has been changed. In particular, a determination is made as to whether the desired air-fuel ratio has changed from rich or stoichiometric to lean, or whether the desired air-fuel ratio has changed from lean to stoichiometric or rich. When the answer to step 1210 is YES, the counter C3 is reset to zero. Otherwise, in step 1214, counter C3 is incremented. Next, in step 1216, a determination is made as to whether the desired air-fuel ratio is stoichiometric or rich. When the answer to step 1216 is YES, a determination is made as to whether counter C3 is greater than threshold value D2 in step 1218. Otherwise, when the answer to step 1216 is NO, a determination is made as to whether counter C3 is greater than threshold value D3 in step 1220. When the answer to either step 1218 or step 1220 is YES, the routine enables monitoring in step 1222.

In other words, duration D2 and duration D3 represent periods before which first output of exhaust sensor 140 cannot be used for feedback control because it will indicate stoichiometric even when the exhaust air-fuel ratio entering NO$_x$ trap 72 is not stoichiometric. Thus, when changing from stoichiometric or rich to lean, first output of exhaust sensor 140 is valid for monitoring or feedback control after duration D3. Similarly, when changing from lean operation to rich or stoichiometric operation, first output of exhaust sensor 140 is valid for monitoring or feedback control after duration D2. In a preferred embodiment, duration D2 is based on oxygen storage of trap 72 and duration D3 is based on both oxygen storage and NOx storage of trap 72. Stated another way, once the oxygen storage is saturated when changing from rich to lean, SIGNAL1 is indicative of the air-fuel ratio entering trap 72. And once the oxygen stored and NO$_x$ stored is reduced when changing from lean to rich, SIGNAL1 is indicative of the air-fuel ratio entering trap 72.

Continuing with FIG. 12, in step 1224, a determination of air-fuel error (afe) is made by subtracting desired air-fuel ratio (air_fuel_desired) and first output of exhaust sensor 140 (SIGNAL1). Next, in step 1226, fuel injection signal (fpw) is calculated in a manner similar to step 1114.

When the answers to either step 1218 or step 1220 are NO, the routine continues to step 1228 to calculate fuel injection signal (fpw) as described herein in step 1116. Thus, according to the present invention, it is possible to utilize the first output of exhaust sensor 140 for feedback air-fuel control.

Figure 13:
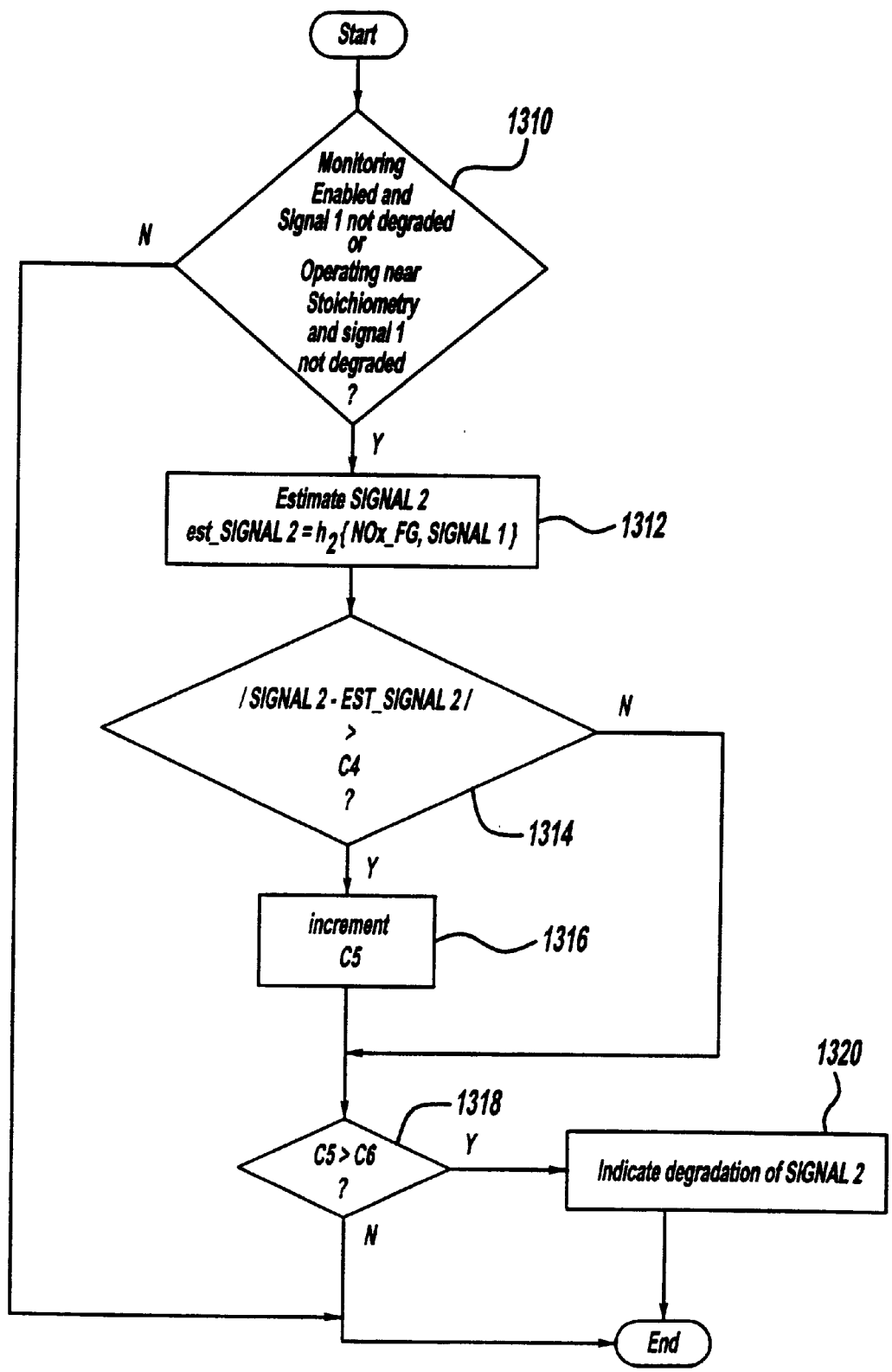

Referring now to FIG. 13, a routine is described for determining degradation of the second output signal of exhaust sensor 140. In particular, a routine is described for determining degradation of indicated NO$_x$ concentration based on the first output signal of exhaust gas sensor 140, when the first output signal is indicative of an exhaust air-fuel ratio. First, in step 1310, a determination is made as to whether monitoring is enabled as described in step 1222, or whether the engine is operating in a near stoichiometric condition. Further, a determination is also made as to whether the first output signal of exhaust sensor 140 is degraded. In other words, when SIGNAL1 is indicative of the air-fuel ratio entering trap 72, it can be used to provide an estimate of NO$_x$ concentration exiting trap 72. When the answer to step 1310 is YES, the routine continues to step 1312. In step 1312, the routine estimates the second output signal (est_signal 2) based on several conditions. In particular, function h2 is used with the feedgas NO$_x$ (NOx_fg) and the first output signal of exhaust sensor 140 (SIGNAL1). In other words, the routine attempts to estimate NO$_x$ exiting trap 72 based on NO$_x$ entering trap 72 and exhaust air-fuel ratio. In addition, various other dynamic effects of NO$_x$ trap 72 can be added to account for oxygen storage and nitrogen oxide and oxygen reduction. Further, efficiency of trap 72 can be included to estimate NO$_x$ exiting based on NOx entering trap 72. However, if performed during stoichiometric operation, it can be assumed that net NO$_x$ stored is constant. Next, in step 1314, the absolute value of the difference between the estimated NO$_x$ exiting trap 72 (EST_SIGNAL2) and measured second output of exhaust sensor 140 (SIGNAL2) is compared to threshold value C4. When the answer to step 1314 is YES, counter C5 is incremented in step 1316. Next, in step 1318, a determination is made as to whether counter C5 is greater than threshold C6. When the answer to step 1318 is YES, the routine indicates degradation of the second output of exhaust sensor 140 in step 1320.

Thus, according to the present invention, it is possible to determine when the NO$_x$ sensor, which is the second output of exhaust sensor 140, has degraded by comparing to an estimated value of exiting NO$_x$ trap 72.

Figure 14:
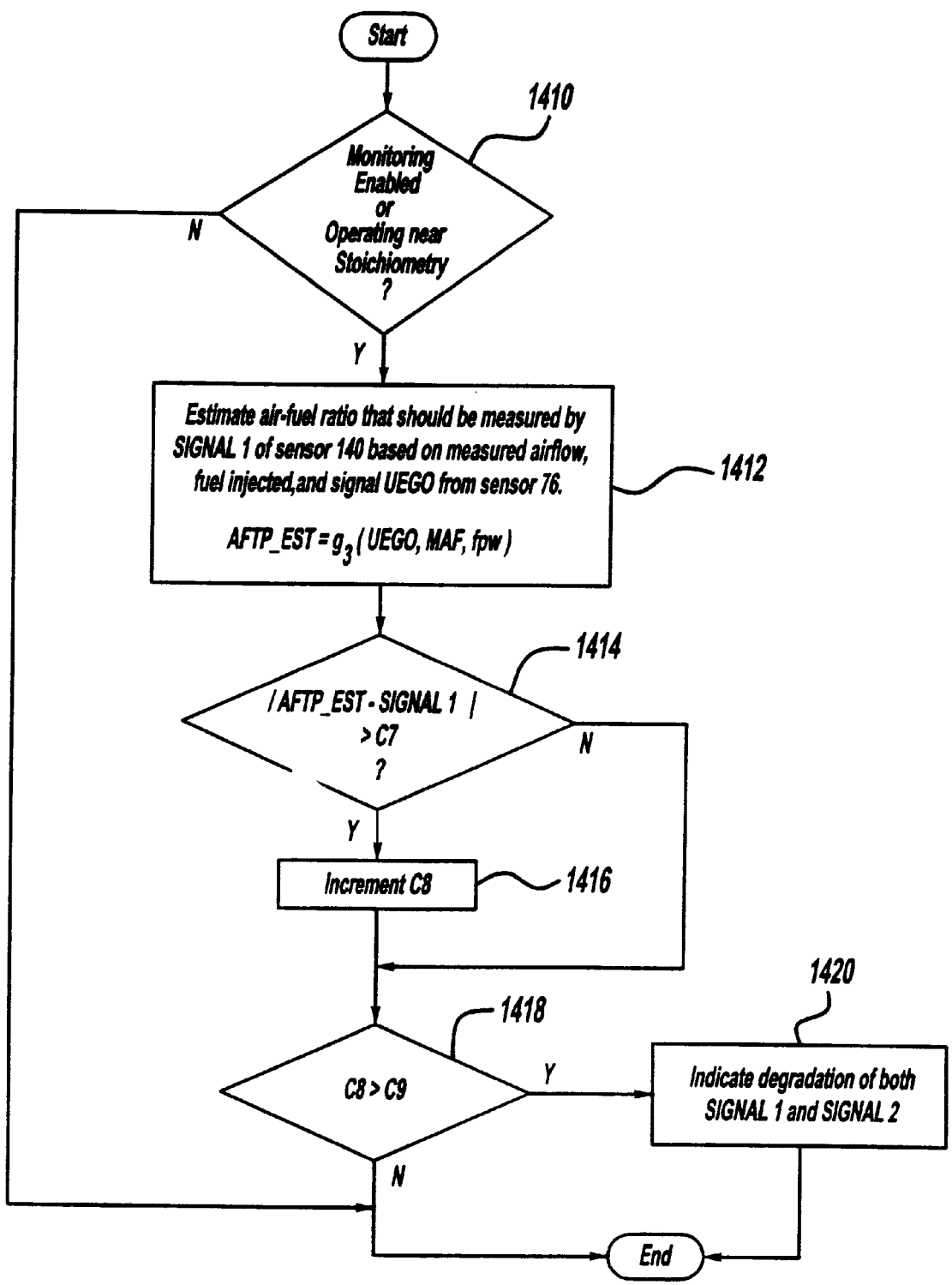

Referring now to FIG. 14, a routine is described for determining degradation of the second output signal of sensor 140 based on the first output signal of sensor 140. First, a determination is made in step 1410 as to whether monitoring has been enabled or whether operating near stoichiometry. When the answer to step 1410 is YES, the routine continues to step 1412. In step 1412, the routine estimates the air-fuel ratio that should be measured by the first output signal (SIGNAL1) of exhaust sensor 140. In other words, the routine estimates exhaust air-fuel ratio exiting NO$_x$ trap 72 based on various operating parameters. The estimated air-fuel ratio (AFTP_EST) is estimated based on air-fuel ratio measured by sensor 76 (UEGO), mass airflow measured by mass airflow sensor 100, and fuel injection amount (fpw) in a preferred embodiment. Those skilled in the art will recognize, in view of this disclosure, various other signals and methods that can be used to estimate exhaust air-fuel ratio exiting a NO$_x$ trap. For example, dynamic effects of both catalyst 70 and 72 can be included that account for NO$_x$ storage, oxygen storage, temperature effects, and various other effects known to those skilled in the art.

Continuing with FIG. 14, in step 1414, the absolute value of the difference between the estimated exhaust air-fuel ratio (AFTP_EST) in the first output signal of exhaust gas sensor 140 (SIGNAL1) is compared to threshold C7. When the answer to step 1414 is YES, counter C8 is incremented in step 1416. Next, in step 1418, counter C8 is compared to threshold C9 in step 1418. When the answer to step 1418 is YES, an indication is provided in step 1420 that both the first output signal and a second output signal of exhaust sensor 140 have been degraded. Thus, according to the present invention, it is possible to determine that the NO$_x$ concentration measured by the second output signal of exhaust sensor 140 is degraded when it is determined that the oxygen partial pressure indicated in the first output signal of exhaust sensor 140 has been degraded.

Figure 15A:
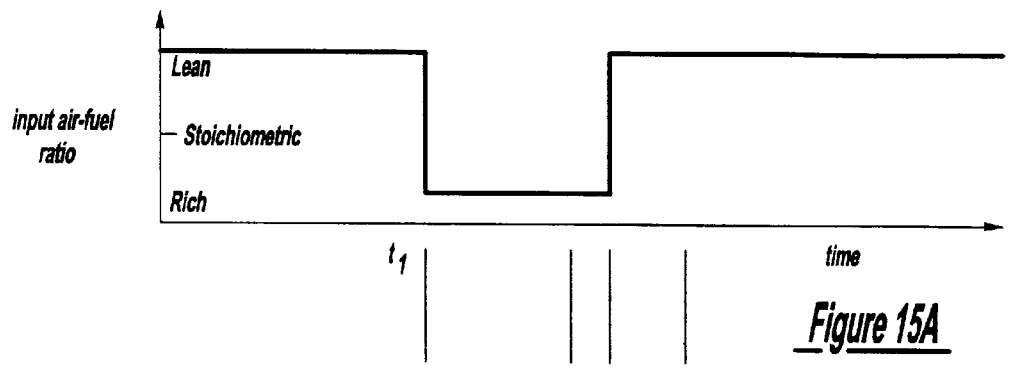
Figure 15B:
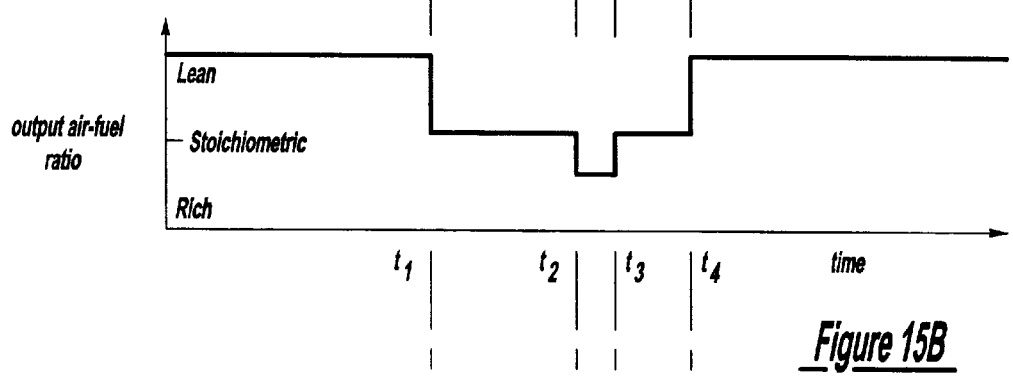
Figure 15C:
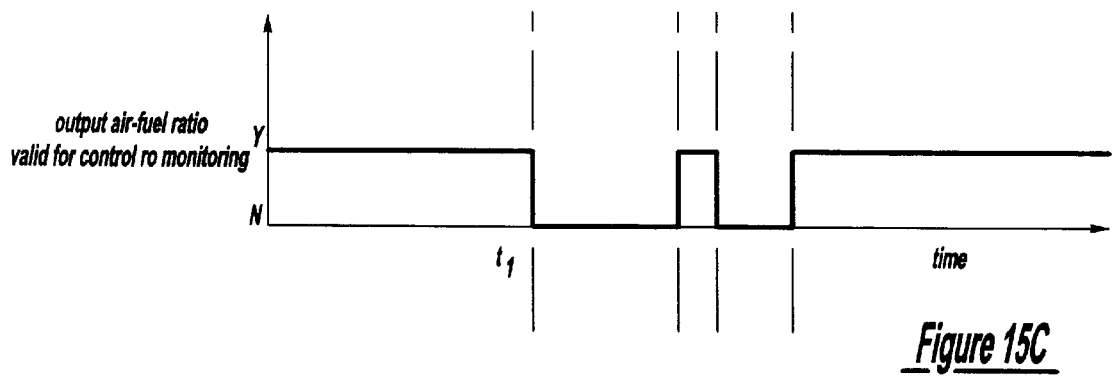

Referring now to FIGS. 15A–15C, these figures show an example of operation according to the present invention. In particular, the graphs show when first output signal (SIGNAL1) of sensor 140 is valid for air-fuel control or for monitoring. FIG. 15A shows air-fuel ratio entering NO$_x$ trap 72 versus time. FIG. 15B shows air-fuel ratio exiting NO$_x$ trap 72 versus time. FIG. 15C indicates whether first output signal (SIGNAL1) of sensor 140 is valid for air-fuel control or for monitoring.

Before time t1, the entering air-fuel ratio and exiting air-fuel ratio are both lean and first output signal (SIGNAL1) is valid for control or monitoring. Then, at time t1, a determination is made to end lean operation and purge NO$_x$ stored in trap 72 due to tailpipe grams of NO$_x$/mile, or because a fuel economy benefit is no longer provided by operating lean, or for various other reasons as described above herein. At time t1, entering air-fuel ratio is changed from lean to rich. Similarly, at time t1, air-fuel ratio exiting changes to stoichiometric until all stored NO$_x$ and oxygen are reduced, which occurs at time t2. Thus, according to the present invention, the stoichiometric air-fuel ratio measured downstream of NO$_x$ trap 72 during the interval from time t1 to time t2, is not equal to the air-fuel ratio upstream of NO$_x$ trap 72. After time t2, a rich exhaust air-fuel ratio is measured downstream of NO$_x$ trap 72 and this measurement can be used for air-fuel control or monitoring. At time t3, entering air-fuel is changed back to a lean air-fuel ratio. Again, air-fuel ratio exiting changes to stoichiometric until all the oxygen storage capacity of NO$_x$ trap 72 is saturated at time t4. Thus, according to the present invention, the stoichiometric air-fuel ratio measured downstream of $NO_x$ trap 72 during the interval from time t3 to time t4 is not equal to the air-fuel ratio upstream of $NO_x$ trap 72. After time t4, the entering air-fuel ratio can be measured by sensor 140 and thus can be used for control or monitoring.

Those skilled in the art will recognize in view of this disclosure that the above methods are applicable with any decontamination method. In a preferred embodiment, the decontamination method described in U.S. Pat. No. 5,758,493, which is hereby incorporated by reference, can be used.

Additional features of the present invention, as well as additional description of various features already described above, are included in the following paragraphs which refer to FIGS. 16–26.

Figure 16:
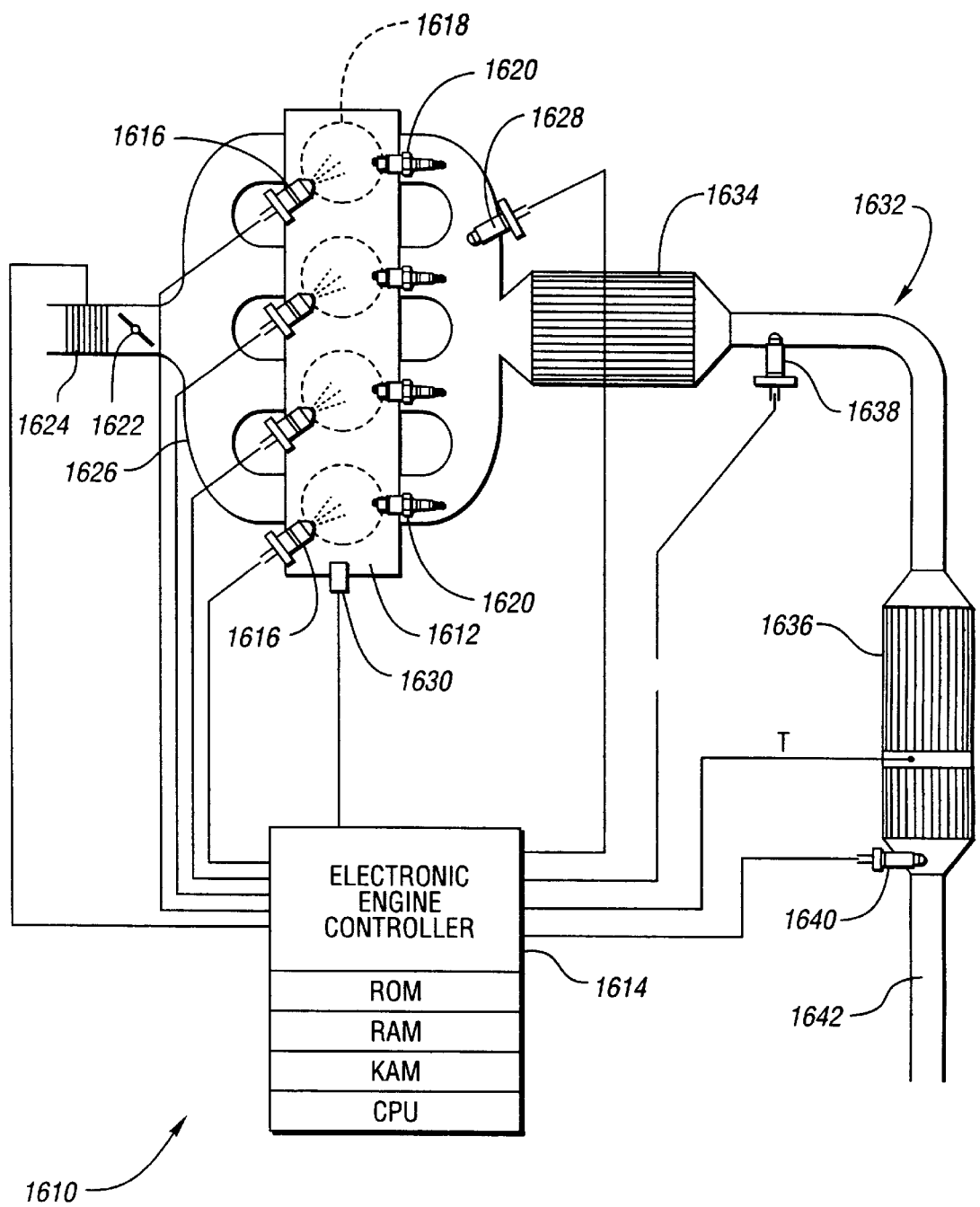
FIG. 16 is a schematic of an exemplary system for practicing the invention.

Referring now to FIG. 16, an exemplary control system 1610 for a gasoline-powered internal combustion engine 1612 of a motor vehicle includes an electronic engine controller 1614 having a processor ("CPU"); input/output ports; an electronic storage medium containing processor-executable instructions and calibration values, shown as read-only memory ("ROM") in this particular example; random-access memory ("RAM"); "keep-alive" memory ("KAM"); and a data bus of any suitable configuration. Engine 1612 is a four-cylinder example of engine 10. The controller 1614 receives signals from a variety of sensors coupled to the engine 1612 and/or the vehicle as described more fully below in turn, controls the operation of each of a set of fuel injectors 1616, each of which is positioned to inject fuel into a respective cylinder 1618 of the engine 1612 in precise quantities as determined by the controller 1614. The controller 1614 similarly controls the individual operation, i.e., timing, of the current directed through each of a set of spark plugs 1620 in a known manner.

The controller 1614 also controls an electronic throttle 1622 that regulates the mass flow of air into the engine 1612. An air mass flow sensor 1624, positioned at the air intake to the engine's intake manifold 1626, provides a signal MAF representing the air mass flow resulting from positioning of the engine's throttle 1622. The air flow signal MAF from the air mass flow sensor 1624 is utilized by the controller 1614 to calculate an air mass value AM which is indicative of a mass of air flowing per unit time into the engine's induction system.

A first oxygen sensor 1628 coupled to the engine's exhaust manifold detects the oxygen content of the exhaust gas generated by the engine 1612 and transmits a representative output signal to the controller 1614. The first oxygen sensor 1628 provides feedback to the controller 1614 for improved control of the air-fuel ratio of the air-fuel mixture supplied to the engine 1612, particularly during operation of the engine 1612 at or near the stoichiometric air-fuel ratio ($\lambda$=1.00). A plurality of other sensors, indicated generally at 30, generate additional signals including an engine speed signal N and an engine load signal LOAD in a known manner, for use by the controller 1614. It will be understood that the engine load sensor 1630 can be of any suitable configuration, including, by way of example only, an intake manifold pressure sensor, an intake air mass sensor, or a throttle position/angle sensor.

An exhaust system 1632 receives the exhaust gas generated upon combustion of the air-fuel mixture in each cylinder 1618. The exhaust system 1632 includes a plurality of emissions control devices, specifically, an upstream three-way catalytic converter ("three-way catalyst 1634") and a downstream $NO_x$ trap 1636. The three-way catalyst 1634 contains a catalyst material that chemically alters the exhaust gas in a known manner. The trap 1636 alternately stores and releases amounts of engine-generated $NO_x$, based upon such factors, for example, as the intake air-fuel ratio, the trap temperature T (as determined by a suitable trap temperature sensor, not shown), the percentage exhaust gas recirculation, the barometric pressure, the relative humidity of ambient air, the instantaneous trap "fullness," the current extent of "reversible" sulfurization, and trap aging effects (due, for example, to permanent thermal aging, or to the "deep" diffusion of sulfur into the core of the trap material which cannot subsequently be purged). A second oxygen sensor 1638, positioned immediately downstream of the three-way catalyst 1634, provides exhaust gas oxygen content information to the controller 1614 in the form of an output signal SIGNAL0. The second oxygen sensor's output signal SIGNAL0 is useful in optimizing the performance of the three-way catalyst 1634, and in characterizing the trap's $NO_x$-storage ability in a manner to be described further below.

The exhaust system 1632 further includes a $NO_x$ sensor 1640 positioned downstream of the trap 1636. In the exemplary embodiment, the $NO_x$ sensor 40 generates two output signals, specifically, a first output signal SIGNAL1 that is representative of the instantaneous oxygen concentration of the exhaust gas exiting the vehicle tailpipe 1642, and a second output signal SIGNAL2 representative of the instantaneous $NO_x$ concentration in the tailpipe exhaust gas, as taught in U.S. Pat. No. 5,953,907. It will be appreciated that any suitable sensor configuration can be used, including the use of discrete tailpipe exhaust gas sensors to thereby generate the two desired signals SIGNAL1 and SIGNAL2.

Generally, during vehicle operation, the controller 1614 selects a suitable engine operating condition or operating mode characterized by combustion of a "near-stoichiometric" air-fuel mixture, i.e., one whose air-fuel ratio is either maintained substantially at, or alternates generally about, the stoichiometric air-fuel ratio; or of an air-fuel mixture that is either "lean" or "rich" of the near-stoichiometric air-fuel mixture. A selection by the controller 1614 of "lean burn" engine operation, signified by the setting of a suitable lean-burn request flag LB_RUNNING_FLG to logical one, means that the controller 1614 has determined that conditions are suitable for enabling the system's lean-burn feature, whereupon the engine 1612 is alternatingly operated with lean and rich air-fuel mixtures for the purpose of improving overall vehicle fuel economy. The controller 1614 bases the selection of a suitable engine operating condition on a variety of factors, which may include determined measures representative of instantaneous or average engine speed/engine load, or of the current state or condition of the trap (e.g., the trap's $NO_x$-storage efficiency, the current $NO_x$ "fill" level, the current $NO_x$ fill level relative to the trap's current $NO_x$-storage capacity, the trap's temperature T, and/or the trap's current level of sulfurization), or of other operating parameters, including but not limited to a desired torque indicator obtained from an accelerator pedal position sensor, the current vehicle tailpipe $NO_x$ emissions (determined, for example, from the second output signal SIGNAL2 generated by the $NO_x$ sensor 40), the percent exhaust gas recirculation, the barometric pressure, or the relative humidity of ambient air.

Figure 17B:
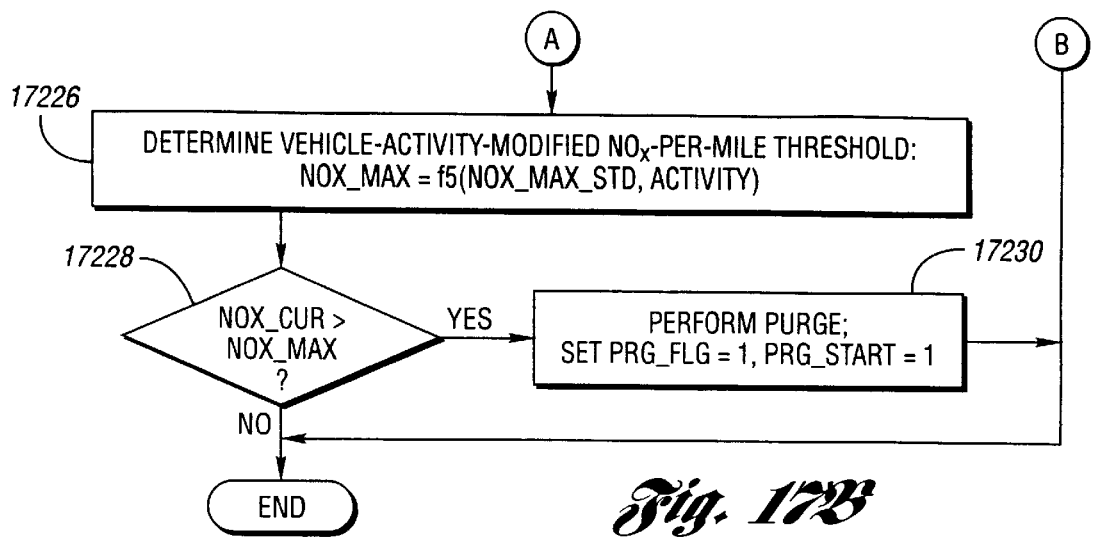
FIGS. 17–22 are flow charts depicting exemplary control methods used by the exemplary system.

Referring to FIG. 17, after the controller 1614 has confirmed at step 17210 that the lean-burn feature is not disabled and, at step 17212, that lean-burn operation has otherwise been requested, the controller 1614 conditions enablement of the lean-burn feature, upon determining that tailpipe $NO_x$ emissions as detected by the $NO_x$ sensor 1640 do not exceed permissible emissions levels. Specifically, after the controller 1614 confirms that a purge event has not just commenced (at step 17214), for example, by checking the current value of a suitable flag PRG_START_FLG stored in KAM, the controller 1614 determines an accumulated measure TP_NOX_TOT representing the total tailpipe $NO_x$ emissions (in grams) since the start of the immediately-prior $NO_x$ purge or desulfurization event, based upon the second output signal SIGNAL2 generated by the $NO_x$ sensor 1640 and determined air mass value AM (at steps 17216 and 17218). Because, in the exemplary system 1610, both the current tailpipe emissions and the permissible emissions level are expressed in units of grams per vehicle-mile-traveled to thereby provide a more realistic measure of the emissions performance of the vehicle, in step 17220, the controller 1614 also determines a measure DIST_EFF_CUR representing the effective cumulative distance "currently" traveled by the vehicle, that is, traveled by the vehicle since the controller 1614 last initiated a $NO_x$ purge event.

While the current effective-distance-traveled measure DIST_EFF_CUR is determined in any suitable manner, in the exemplary system 1610, the controller 1614 generates the current effective-distance-traveled measure DIST_EFF_CUR at step 17220 by accumulating detected or determined values for instantaneous vehicle speed VS, as may itself be derived, for example, from engine speed N and selected-transmission-gear information. Further, in the exemplary system 1610, the controller 1614 "clips" the detected or determined vehicle speed at a minimum velocity VS_MIN, for example, typically ranging from perhaps about 0.2 mph to about 0.3 mph (about 0.3 km/hr to about 0.5 km/hr), in order to include the corresponding "effective" distance traveled, for purposes of emissions, when the vehicle is traveling below that speed, or is at a stop. Most preferably, the minimum predetermined vehicle speed VS_MIN is characterized by a level of $NO_x$ emissions that is at least as great as the levels of $NO_x$ emissions generated by the engine 1612 when idling at stoichiometry.

At step 17222, the controller 1614 determines a modified emissions measure NOX_CUR as the total emissions measure TP_NOX_TOT divided by the effective-distance-traveled measure DIST_EFF_CUR. As noted above, the modified emissions measure NOX_CUR is favorably expressed in units of "grams per mile."

Because certain characteristics of current vehicle activity impact vehicle emissions, for example, generating increased levels of exhaust gas constituents upon experiencing an increase in either the frequency and/or the magnitude of changes in engine output, the controller 1614 determines a measure ACTIVITY representing a current level of vehicle activity (at step 17224 of FIG. 17) and modifies a predetermined maximum emissions threshold NOX_MAX_STD (at step 17226) based on the determined activity measure to thereby obtain a vehicle-activity-modified $NO_x$-per-mile threshold NOX_MAX which seeks to accommodate the impact of such vehicle activity.

While the vehicle activity measure ACTIVITY is determined at step 17224 in any suitable manner based upon one or more measures of engine or vehicle output, including but not limited to a determined desired power, vehicle speed VS, engine speed N, engine torque, wheel torque, or wheel power, in the exemplary system 1610, the controller 1614 generates the vehicle activity measure ACTIVITY based upon a determination of instantaneous absolute engine power Pe, as follows:

$$Pe = TQ * N * k_I,$$

where TQ represents a detected or determined value for the engine's absolute torque output, N represents engine speed, and $k_I$ is a predetermined constant representing the system's moment of inertia. The controller 1614 filters the determined values Pe over time, for example, using a high-pass filter $G_1(s)$, where s is the Laplace operator known to those skilled in the art, to produce a high-pass filtered engine power value HPe. After taking the absolute value AHPe of the high-pass-filtered engine power value HPe, the resulting absolute value AHPe is low-pass-filtered with filter $G_j(s)$ to obtain the desired vehicle activity measure ACTIVITY.

Similarly, while the current permissible emissions limit NOX_MAX is modified in any suitable manner to reflect current vehicle activity, in the exemplary system 1610, at step 17226, the controller 1614 determines a current permissible emissions level NOX_MAX as a predetermined function $f_5$ of the predetermined maximum emissions threshold NOX_MAX_STD based on the determined vehicle activity measure ACTIVITY. By way of example only, in the exemplary system 1610, the current permissible emissions level NOX_MAX typically varies between a minimum of about 20 percent of the predetermined maximum emissions threshold NOX_MAX_STD for relatively-high vehicle activity levels (e.g., for many transients) to a maximum of about seventy percent of the predetermined maximum emissions threshold NOX_MAX_STD (the latter value providing a "safety factor" ensuring that actual vehicle emissions do not exceed the proscribed government standard NOX_MAX_STD).

Referring again to FIG. 17, at step 17228, the controller 1614 determines whether the modified emissions measure NOX_CUR as determined in step 17222 exceeds the maximum emissions level NOX_MAX as determined in step 17226. If the modified emissions measure NOX_CUR does not exceed the current maximum emissions level NOX_MAX, the controller 1614 remains free to select a lean engine operating condition in accordance with the exemplary system's lean-burn feature. If the modified emissions measure NOX_CUR exceeds the current maximum emissions level NOX_MAX, the controller 1614 determines that the "fill" portion of a "complete" lean-burn fill/purge cycle has been completed, and the controller immediately initiates a purge event at step 230 by setting suitable purge event flags PRG_FLG and PRG_START_FLG to logical one.

If, at step 17214 of FIG. 17, the controller 1614 determines that a purge event has just been commenced, as by checking the current value for the purge-start flag PRG_START_FLG, the controller 1614 resets the previously determined values TP_NOX_TOT and DIST_EFF_CUR for the total tailpipe $NO_x$ and the effective distance traveled and the determined modified emissions measure NOX_CUR, along with other stored values FG_NOX_TOT and FG_NOX_TOT_MOD (to be discussed below), to zero at step 17232. The purge-start flag PRG_START_FLG is similarly reset to logic zero at that time.

Figure 18A:
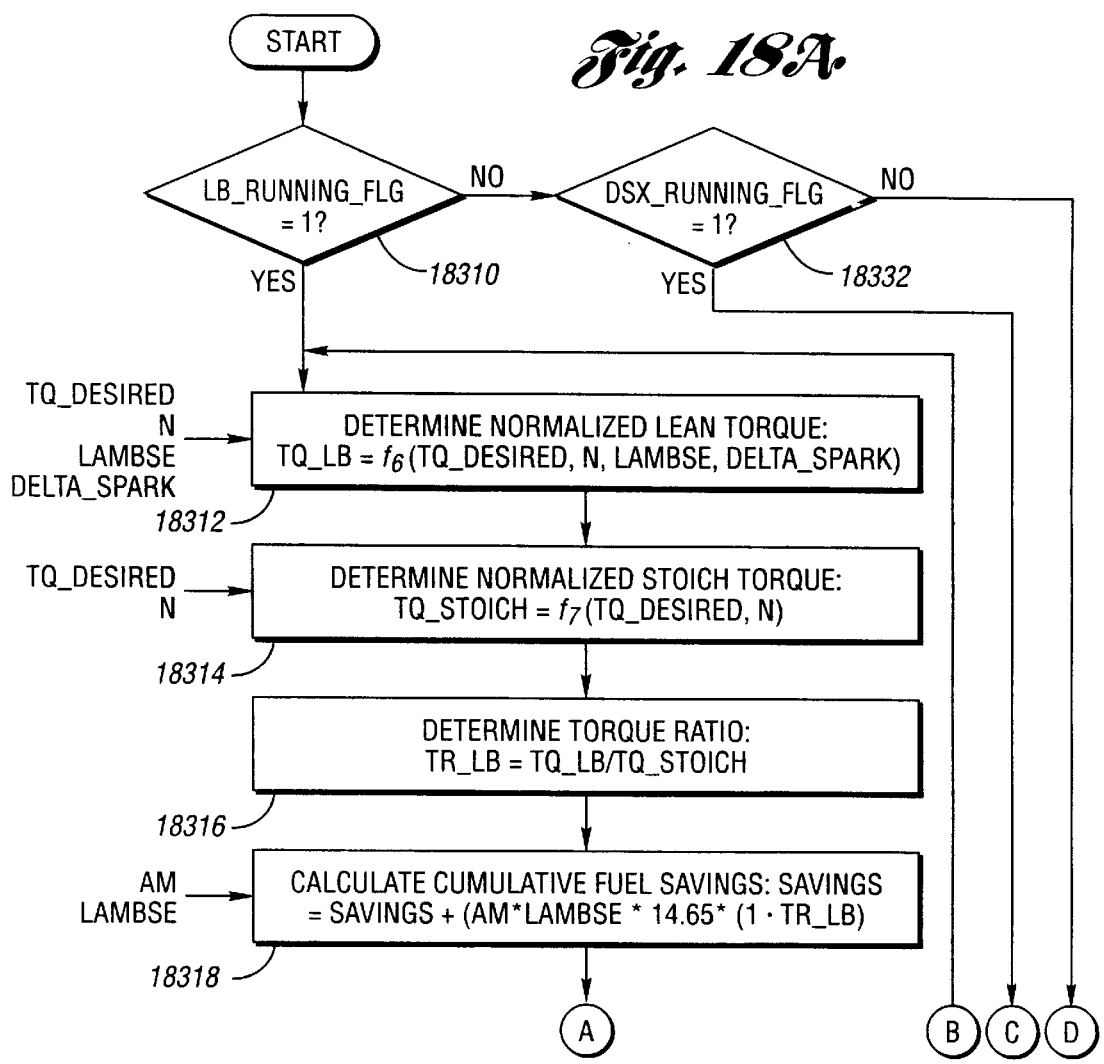
Figure 18C:
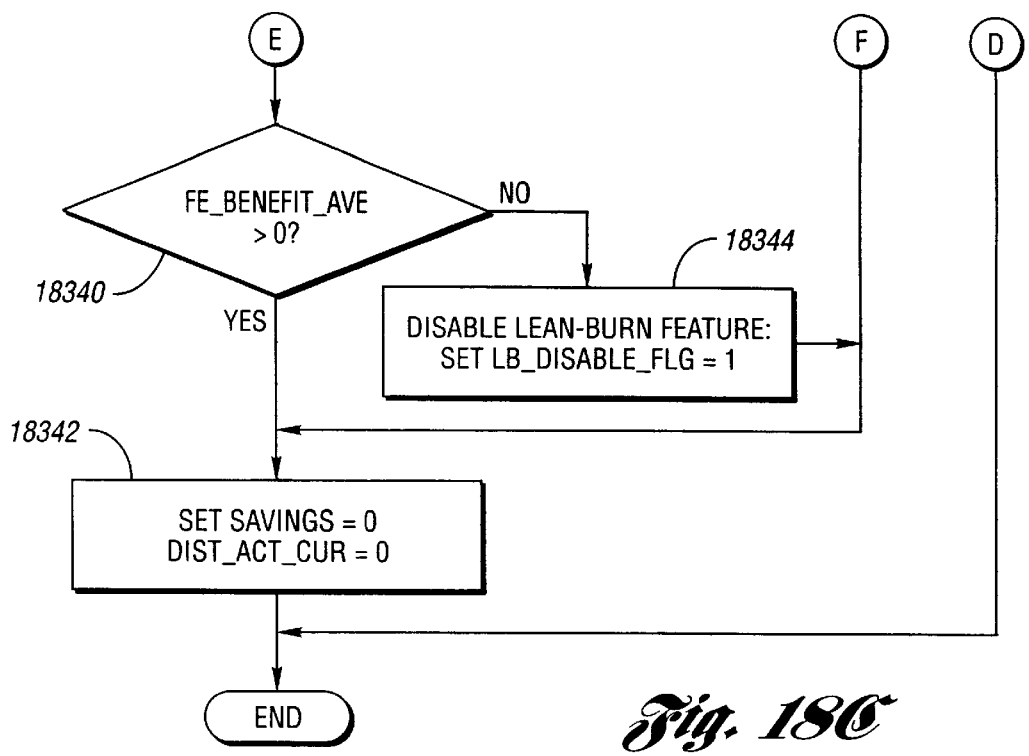
Figure 19:
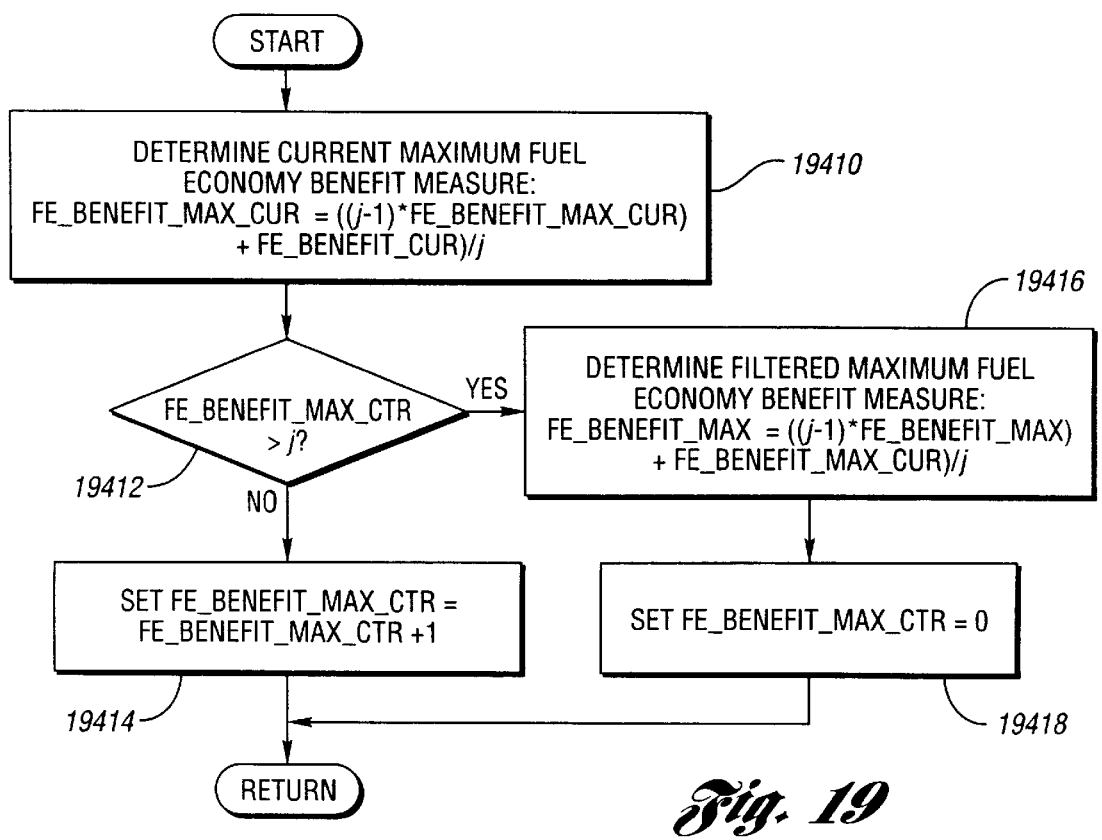
Figure 20:
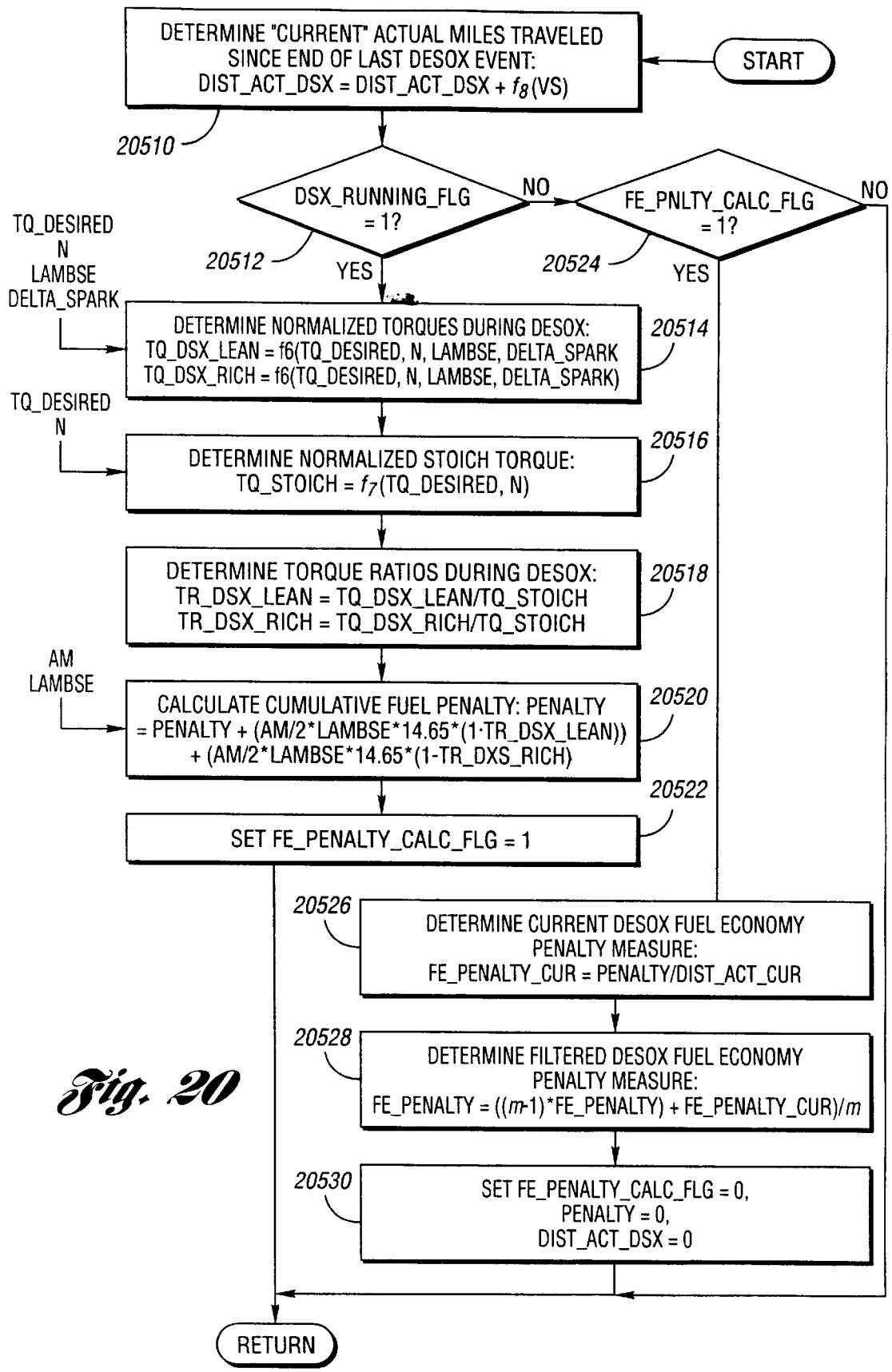

Referring generally to FIGS. 18–20, in the exemplary system 1610, the controller 1614 further conditions enablement of the lean-burn feature upon a determination of a positive performance impact or "benefit" of such lean-burn operation over a suitable reference operating condition, for example, a near-stoichiometric operating condition at MBT. By way of example only, the exemplary system 1610 uses a fuel efficiency measure calculated for such lean-burn operation with reference to engine operation at the near-stoichiometric operating condition and, more specifically, a relative fuel efficiency or "fuel economy benefit" measure. Other suitable performance impacts for use with the exemplary system 1610 include, without limitation, fuel usage, fuel savings per distance traveled by the vehicle, engine efficiency, overall vehicle tailpipe emissions, and vehicle drivability.

Indeed, the invention contemplates determination of a performance impact of operating the engine 1612 and/or the vehicle's powertrain at any first operating mode relative to any second operating mode, and the difference between the first and second operating modes is not intended to be limited to the use of different air-fuel mixtures. Thus, the invention is intended to be advantageously used to determine or characterize an impact of any system or operating condition that affects generated torque, such as, for example, comparing stratified lean operation versus homogeneous lean operation, or determining an effect of exhaust gas recirculation (e.g., a fuel benefit can thus be associated with a given EGR setting), or determining the effect of various degrees of retard of a variable cam timing ("VCT") system, or characterizing the effect of operating charge motion control valves ("CMCV," an intake-charge swirl approach, for use with both stratified and homogeneous lean engine operation).

More specifically, the exemplary system 1610, the controller 1614 determines the performance impact of lean-burn operation relative to stoichiometric engine operation at MBT by calculating a torque ratio TR defined as the ratio, for a given speed-load condition, of a determined indicated torque output at a selected air-fuel ratio to a determined indicated torque output at stoichiometric operation, as described further below. In one embodiment, the controller 1614 determines the torque ratio TR based upon stored values $TQ_{i,j,k}$ for engine torque, mapped as a function of engine speed N, engine load LOAD, and air-fuel ratio LAMBSE.

Alternatively, the invention contemplates use of absolute torque or acceleration information generated, for example, by a suitable torque meter or accelerometer (not shown), with which to directly evaluate the impact of, or to otherwise generate a measure representative of the impact of, the first operating mode relative to the second operating mode. While the invention contemplates use of any suitable torque meter or accelerometer to generate such absolute torque or acceleration information, suitable examples include a strain-gage torque meter positioned on the powertrain's output shaft to detect brake torque, and a high-pulse-frequency Hall-effect acceleration sensor positioned on the engine's crankshaft. As a further alternative, the invention contemplates use, in determining the impact of the first operating mode relative to the second operating mode, of the above-described determined measure Pe of absolute instantaneous engine power.

Where the difference between the two operating modes includes different fuel flow rates, as when comparing a lean or rich operating mode to a reference stoichiometric operating mode, the torque or power measure for each operating mode is preferably normalized by a detected or determined fuel flow rate. Similarly, if the difference between the two operating modes includes different or varying engine speed-load points, the torque or power measure is either corrected (for example, by taking into account the changed engine speed-load conditions) or normalized (for example, by relating the absolute outputs to fuel flow rate, e.g., as represented by fuel pulse width) because such measures are related to engine speed and system moment of inertia.

It will be appreciated that the resulting torque or power measures can advantageously be used as "on-line" measures of a performance impact. However, where there is a desire to improve signal quality, i.e., to reduce noise, absolute instantaneous power or normalized absolute instantaneous power can be integrated to obtain a relative measure of work performed in each operating mode. If the two modes are characterized by a change in engine speed-load points, then the relative work measure is corrected for thermal efficiency, values for which may be conveniently stored in a ROM look-up table.

Returning to the exemplary system 1610 and the flow chart appearing as FIG. 18, wherein the performance impact is a determined percentage fuel economy benefit/loss associated with engine operation at a selected lean or rich "lean-burn" operating condition relative to a reference stoichiometric operating condition at MBT, the controller 1614 first determines at step 18310 whether the lean-burn feature is enabled. If the lean-burn feature is enabled as, for example indicated by the lean-burn running flag LB_RUNNING_FLG being equal to logical one, the controller 1614 determines a first value TQ_LB at step 18312 representing an indicated torque output for the engine when operating at the selected lean or rich operating condition, based on its selected air-fuel ratio LAMBSE and the degrees DELTA_SPARK of retard from MBT of its selected ignition timing, and further normalized for fuel flow. At step 18314, the controller 1614 determines a second value TQ_STOICH representing an indicated torque output for the engine 1612 when operating with a stoichiometric air-fuel ratio at MBT, likewise normalized for fuel flow. At step 18316, the controller 1614 calculates the lean-burn torque ratio TR_LB by dividing the first normalized torque value TQ_LB with the second normalized torque value TQ_STOICH.

At step 18318 of FIG. 18, the controller 1614 determines a value SAVINGS representative of the cumulative fuel savings to be achieved by operating at the selected lean operating condition relative to the reference stoichiometric operating condition, based upon the air mass value AM, the current (lean or rich) lean-burn air-fuel ratio (LAMBSE) and the determined lean-burn torque ratio TR_LB, wherein

SAVINGS=SAVINGS+(*AM*LAMBSE*14.65*(1−*TR_LB*)).

At step 18320, the controller 1614 determines a value DIST_ACT_CUR representative of the actual miles traveled by the vehicle since the start of the last trap purge or desulfurization event. While the "current" actual distance value DIST_ACT_CUR is determined in any suitable manner, in the exemplary system 1610, the controller 1614 determines the current actual distance value DIST_ACT_CUR by accumulating detected or determined instantaneous values VS for vehicle speed.

Because the fuel economy benefit to be obtained using the lean-burn feature is reduced by the "fuel penalty" of any associated trap purge event, in the exemplary system 1610, the controller 1614 determines the "current" value FE_BENEFIT_CUR for fuel economy benefit only once per "complete" lean-fill/rich-purge cycle, as determined at steps 17228 and 17230 of FIG. 17. And, because the purge event's fuel penalty is directly related to the preceding trap "fill," the current fuel economy benefit value FE_BENEFIT_CUR is preferably determined at the moment that the purge event is deemed to have just been completed. Thus, at step 18322 of FIG. 18, the controller 1614 determines whether a purge event has just been completed following a complete trap fill/purge cycle and, if so, determines at step 18324 a value FE_BENEFIT_CUR representing current fuel economy benefit of lean-burn operation over the last complete fill/purge cycle.

At steps 18326 and 18328 of FIG. 18, current values FE_BENEFIT_CUR for fuel economy benefit are averaged over the first j complete fill/purge cycles immediately following a trap decontaminating event, such as a desulfurization event, in order to obtain a value FE_BENEFIT_MAX_CUR representing the "current" maximum fuel economy benefit which is likely to be achieved with lean-burn operation, given the then-current level of "permanent" trap sulfurization and aging. By way of example only, as illustrated in FIG. 19, maximum fuel economy benefit averaging is performed by the controller 1614 using a conventional low-pass filter at step 19410. In order to obtain a more robust value FE_BENEFIT_MAX for the maximum fuel economy benefit of lean-burn operation, in the exemplary system 1610, the current value FE_BENEFIT_MAX_CUR is likewise filtered over j desulfurization events at steps 19412, 19414, 19416 and 19418.

Returning to FIG. 18, at step 18330, the controller 1614 similarly averages the current values FE_BENFIT_CUR for fuel economy benefit over the last n trap fill/purge cycles to obtain an average value FE_BENEFIT_AVE representing the average fuel economy benefit being achieved by such lean-burn operation and, hence, likely to be achieved with further lean-burn operation. By way of example only, in the exemplary system 1610, the average fuel economy benefit value FE_BENEFIT_AVE is calculated by the controller 1614 at step 18330 as a rolling average to thereby provide a relatively noise-insensitive "on-line" measure of the fuel economy performance impact provided by such lean engine operation.

Because continued lean-burn operation periodically requires a desulfurization event, when a desulfurization event is identified as being in-progress at step 18332 of FIG. 18, the controller 1614 determines a value FE_PENALTY at step 18334 representing the fuel economy penalty associated with desulfurization. While the fuel economy penalty value FE_PENALTY is determined in any suitable manner, an exemplary method for determining the fuel economy penalty value FE_PENALTY is illustrated in FIG. 20. Specifically, in step 20510, the controller 1614 updates a stored value DIST_ACT_DSX representing the actual distance that the vehicle has traveled since the termination or "end" of the immediately preceding desulfurization event. Then, at step 20512, the controller 1614 determines whether the desulfurization event running flag DSX_RUNNING_FLG is equal to logical one, thereby indicating that a desulfurization event is in process. While any suitable method is used for desulfurizing the trap 1636, in the exemplary system 1610, the desulfurization event is characterized by operation of some of the engine's cylinders with a lean air-fuel mixture and other of the engine's cylinders 18 with a rich air-fuel mixture, thereby generating exhaust gas with a slightly-rich bias. At the step 20514, the controller 1614 then determines the corresponding fuel-normalized torque values TQ_DSX_LEAN and TQ_DSX_RICH, as described above in connection with FIG. 18. At step 20516, the controller 1614 further determines the corresponding fuel-normalized stoichiometric torque value TQ_STOICH and, at step 20518, the corresponding torque ratios TR_DSX_LEAN and TR_DSX_RICH.

The controller 1614 then calculates a cumulative fuel economy penalty value, as follows:

PENALTY=PENALTY+(AM/2*LAMBSE*14.65*(1−TR_DSX_LEAN))+(AM/2*LAMBSE*14.65*(1−TR_DSX_RICH))

Then, at step 20522, the controller 1614 sets a fuel economy penalty calculation flag FE_PNLTY_CALC_FLG equal to logical one to thereby ensure that the current desulfurization fuel economy penalty measure FE_PENALTY_CUR is determined immediately upon termination of the on-going desulfurization event.

If the controller 1614 determines, at steps 20512 and 20524 of FIG. 20, that a desulfurization event has just been terminated, the controller 1614 then determines the current value FE_PENALTY_CUR for the fuel economy penalty associated with the terminated desulfurization event at step 20526, calculated as the cumulative fuel economy penalty value PENALTY divided by the actual distance value DIST_ACT_DSX. In this way, the fuel economy penalty associated with a desulfurization event is spread over the actual distance that the vehicle has traveled since the immediately prior desulfurization event.

At step 20528 of FIG. 20, the controller 1614 calculates a rolling average value FE_PENALTY of the last m current fuel economy penalty values FE_PENALTY_CUR to thereby provide a relatively-noise-insensitive measure of the fuel economy performance impact of such desulfurization events. By way of example only, the average negative performance impact or "penalty" of desulfurization typically ranges between about 0.3 percent to about 0.5 percent of the performance gain achieved through lean-burn operation. At step 20530, the controller 1614 resets the fuel economy penalty calculation flag FE_PNLTY_CALC_FLG to zero, along with the previously determined (and summed) actual distance value DIST_ACT_DSX and the current fuel economy penalty value PENALTY, in anticipation for the next desulfurization event.

Returning to FIG. 18, the controller 1614 requests a desulfurization event only if and when such an event is likely to generate a fuel economy benefit in ensuing lean-burn operation. More specifically, at step 18332, the controller 1614 determines whether the difference by which between the maximum potential fuel economy benefit FE_BENEFIT_MAX exceeds the current fuel economy benefit FE_BENEFIT_CUR is itself greater than the average fuel economy penalty FE_PENALTY associated with desulfurization. If so, the controller 1614 requests a desulfurization event by setting a suitable flag SOX_FULL_FLG to logical one. Thus, it will be seen that the exemplary system 1610 advantageously operates to schedule a desulfurization event whenever such an event would produce improved fuel economy benefit, rather than deferring any such decontamination event until contaminant levels within the trap 1636 rise above a predetermined level.

In the event that the controller 1614 determines at step 18332 that the difference between the maximum fuel economy benefit value FE_BENEFIT_MAX and the average fuel economy value FE_BENEFIT_AVE is not greater than the fuel economy penalty FE_PENALTY associated with a decontamination event, the controller 1614 proceeds to step 18336 of FIG. 18, wherein the controller 1614 determines whether the average fuel economy benefit value FE_BENEFIT_AVE is greater than zero. If the average fuel economy benefit value is less than zero, and with the penalty associated with any needed desulfurization event already having been determined at step 18332 as being greater than the likely improvement to be derived from such desulfurization, the controller 1614 disables the lean-burn feature at step 18340 of FIG. 18. The controller 1614 then resets the fuel savings value SAVINGS and the current actual distance measure DIST_ACT_CUR to zero at step 18338.

Figure 21:
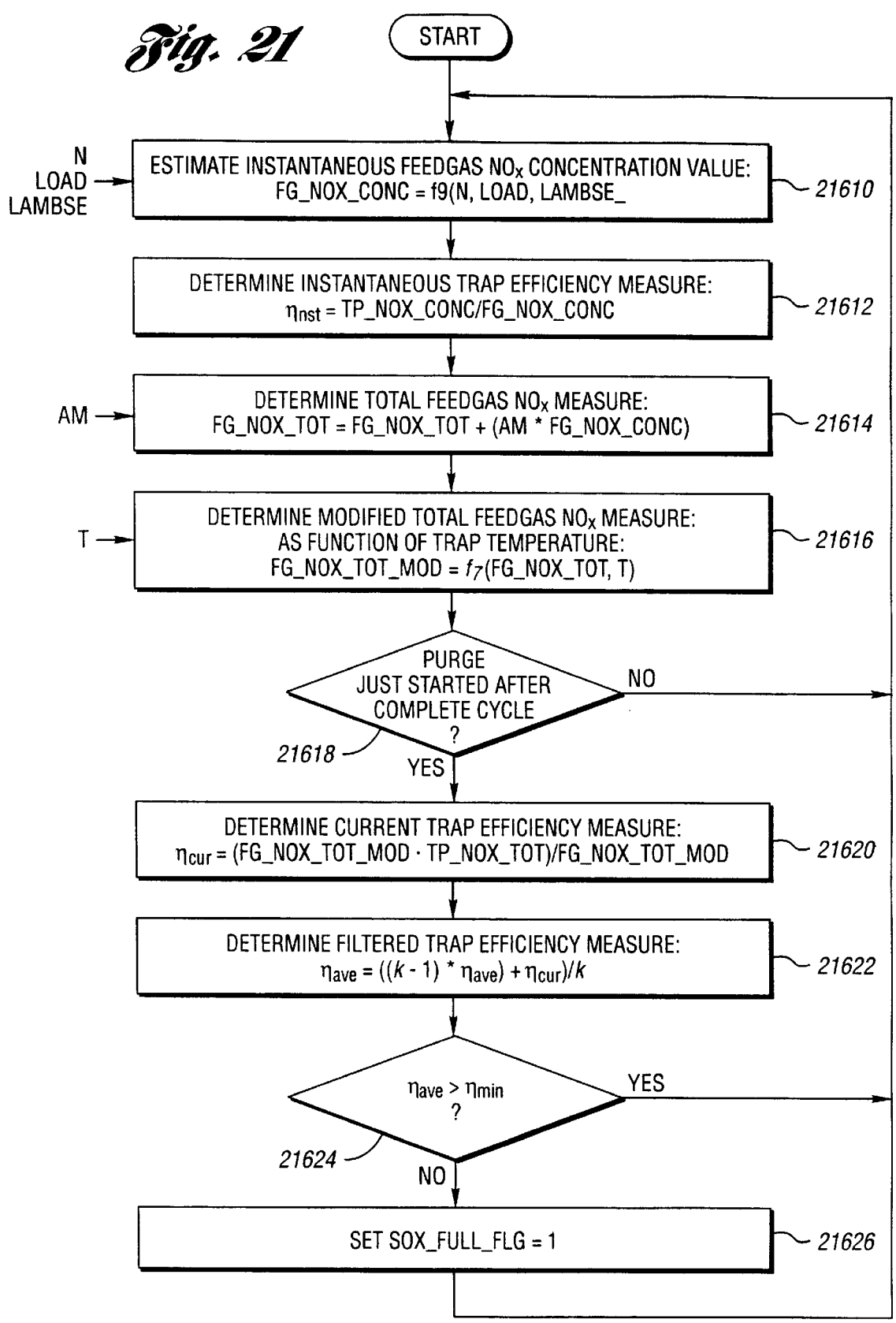

Alternatively, the controller 1614 schedules a desulfurization event during lean-burn operation when the trap's average efficiency $\eta_{ave}$ is deemed to have fallen below a predetermined minimum efficiency $\eta_{min}$. While the average trap efficiency $\eta_{ave}$ is determined in any suitable manner, as seen in FIG. 21, the controller 1614 periodically estimates the current efficiency $\eta_{cur}$ of the trap 1636 during a lean engine operating condition which immediately follows a purge event. Specifically, at step 21610, the controller 1614 estimates a value FG_NOX_CONC representing the $NO_x$ concentration in the exhaust gas entering the trap 1636, for example, using stored values for engine feedgas $NO_x$ that are mapped as a function of engine speed N and load LOAD for "dry" feedgas and, preferably, modified for average trap temperature T (as by multiplying the stored values by the temperature-based output of a modifier lookup table, not shown). Preferably, the feedgas $NO_x$ concentration value FG_NOX_CONC is further modified to reflect the $NO_x$-reducing activity of the three-way catalyst 1634 upstream of the trap 1636, and other factors influencing $NO_x$ storage, such as trap temperature T, instantaneous trap efficiency $\eta_{inst}$, and estimated trap sulfation levels.

At step 21612, the controller 1614 calculates an instantaneous trap efficiency value $\eta$instas the feedgas $NO_x$ concentration value FG_NOX_CONC divided by the tailpipe $NO_x$ concentration value TP_NOX_CONC (previously determined at step 17216 of FIG. 17). At step 21614, the controller 1614 accumulates the product of the feedgas $NO_x$ concentration values FG_NOX_CONC times the current air mass values AM to obtain a measure FG_NOX_TOT representing the total amount of feedgas $NO_x$ reaching the trap 1636 since the start of the immediately-preceding purge event. At step 21616, the controller 1614 determines a modified total feedgas $NO_x$ measure FG_NOX_TOT_MOD by modifying the current value FG_NOX_TOT_ as a function of trap temperature T. After determining at step 21618 that a purge event has just begun following a complete fill/purge cycle, at step 21620, the controller 1614 determines the current trap efficiency measure $\eta_{cur}$ as difference between the modified total feedgas $NO_x$ measure FG_NOX_TOT_MOD and the total tailpipe $NO_x$ measure TP_NOX_TOT (determined at step 17218 of FIG. 17), divided by the modified total feedgas $NO_x$ measure FG_NOX_TOT_MOD.

At step 21622, the controller 1614 filters the current trap efficiency measure measure $\eta_{cur}$, for example, by calculating the average trap efficiency measure $\eta_{ave}$ as a rolling average of the last k values for the current trap efficiency measure $\eta_{cur}$. At step 21624, the controller 1614 determines whether the average trap efficiency measure $\eta_{ave}$ has fallen below a minimum average efficiency threshold $\eta_{min}$. If the average trap efficiency measure $\eta_{ave}$ has indeed fallen below the minimum average efficiency threshold $\eta_{min}$, the controller 1614 sets both the desulfurization request flag SOX_FULL_FLG to logical one, at step 21626 of FIG. 21.

To the extent that the trap 1636 must be purged of stored $NO_x$ to rejuvenate the trap 1636 and thereby permit further lean-burn operation as circumstances warrant, the controller 1614 schedules a purge event when the modified emissions measure NOX_CUR, as determined in step 17222 of FIG. 17, exceeds the maximum emissions level NOX_MAX, as determined in step 17226 of FIG. 17. Upon the scheduling of such a purge event, the controller 1614 determines a suitable rich air-fuel ratio as a function of current engine operating conditions, e.g., sensed values for air mass flow rate. By way of example, in the exemplary embodiment, the determined rich air-fuel ratio for purging the trap 1636 of stored $NO_x$ typically ranges from about 0.65 for "low-speed" operating conditions to perhaps 0.75 or more for "high-speed" operating conditions. The controller 1614 maintains the determined air-fuel ratio until a predetermined amount of CO and/or HC has "broken through" the trap 1636, as indicated by the product of the first output signal SIGNAL1 generated by the $NO_x$ sensor 1640 and the output signal AM generated by the mass air flow sensor 1624.

Figure 22:
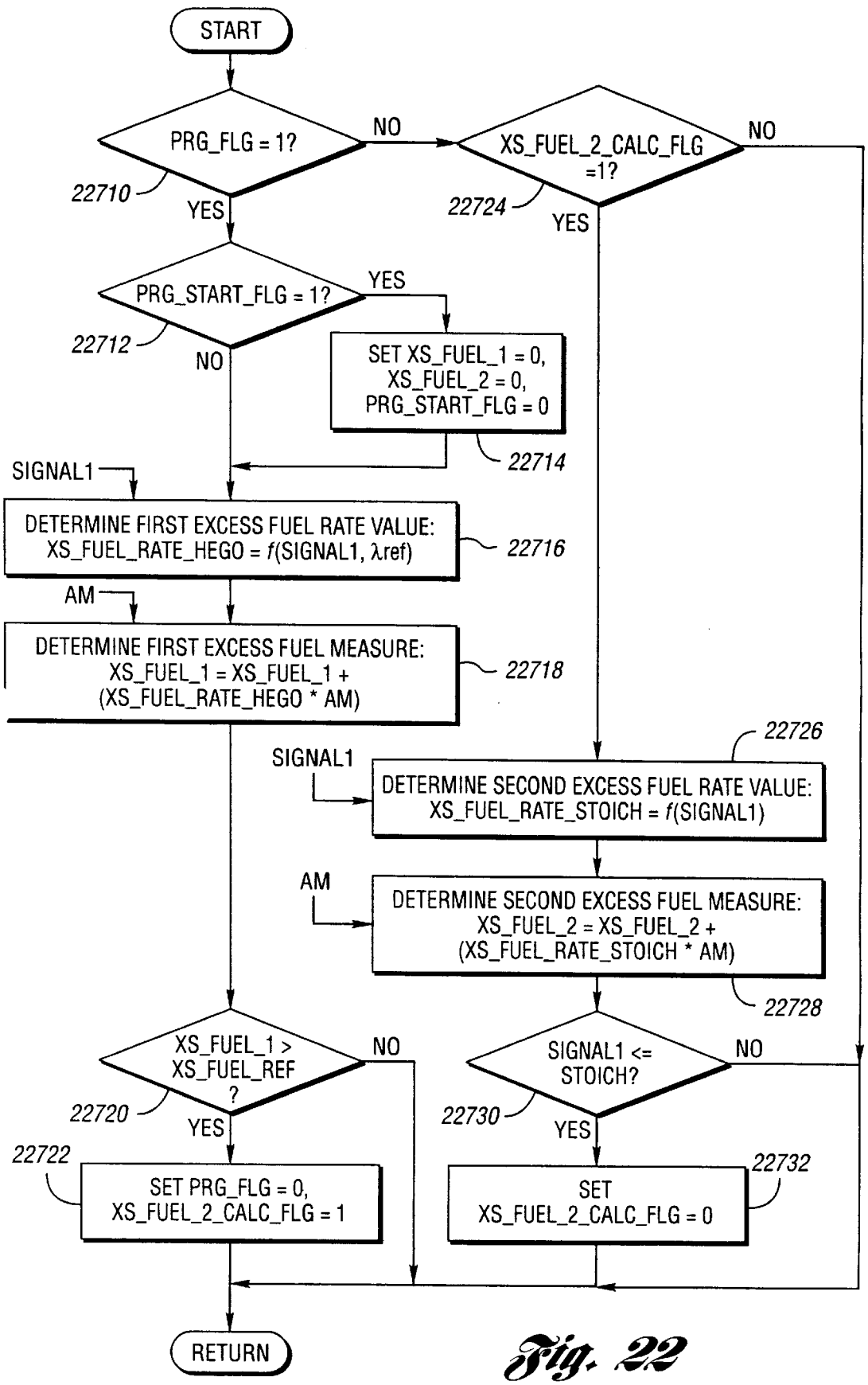
Figure 23A:
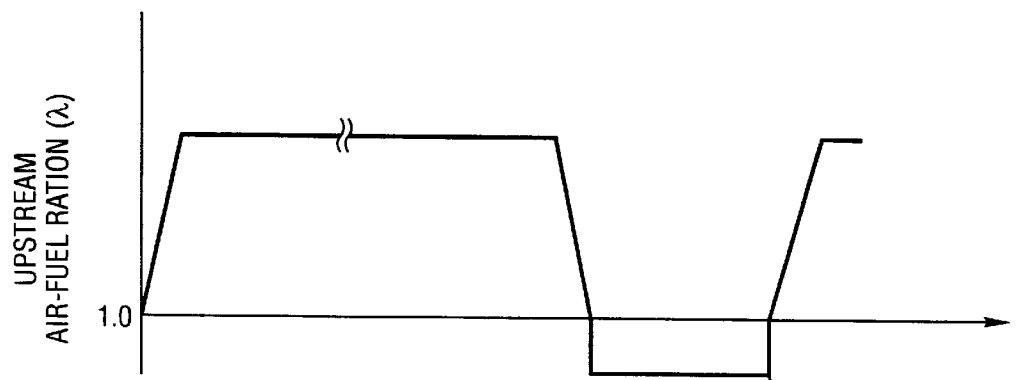
FIGS. 23A and 23B are related plots respectively illustrating a single exemplary trap fill/purge cycle.
Figure 23B:
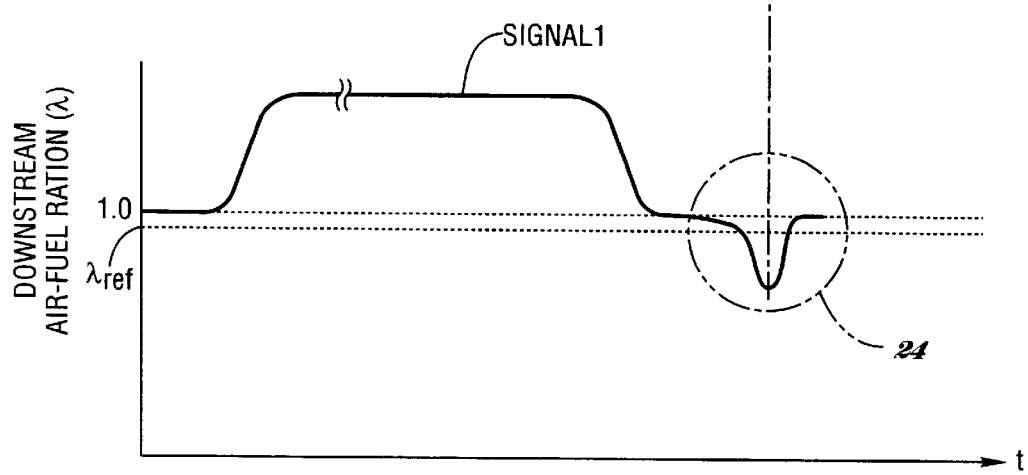
Figure 24:
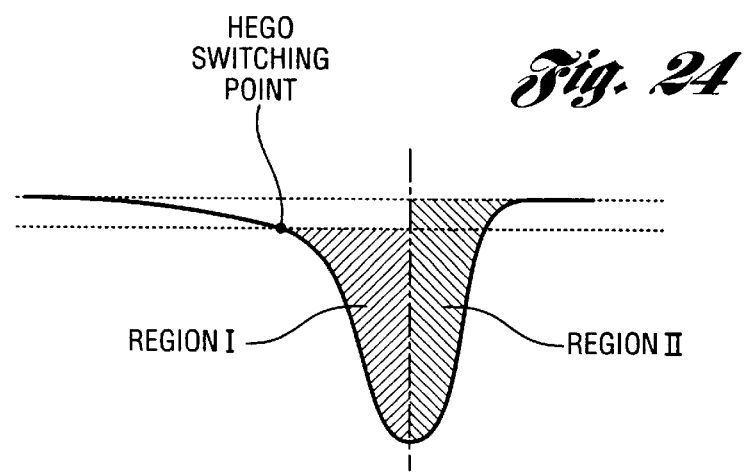
FIG. 24 is an enlarged view of the portion of the plot of FIG. 173B illustrated within circle 9 thereof.

More specifically, as illustrated in the flow chart appearing as FIG. 22 and the plots illustrated in FIGS. 23A, 23B and 24, during the purge event, after determining at step 22710 that a purge event has been initiated, the controller 1614 determines at step 22712 whether the purge event has just begun by checking the status of the purge-start flag PRG_START_FLG. If the purge event has, in fact, just begun, the controller resets certain registers (to be discussed individually below) to zero. The controller 1614 then determines a first excess fuel rate value XS_FUEL_RATE_HEGO at step 22716, by which the first output signal SIGNAL1 is "rich" of a first predetermined, slightly-rich threshold $\lambda_{ref}$ (the first threshold $\lambda_{ref}$ being exceeded shortly after a similarly-positioned HEGO sensor would have "switched"). The controller 1614 then determines a first excess fuel measure XS_FUEL_1 as by summing the product of the first excess fuel rate value XS_FUEL_RATE_HEGO and the current output signal AM generated by the mass air flow sensor 1624 (at step 22718). The resulting first excess fuel measure XS_FUEL_1, which represents the amount of excess fuel exiting the tailpipe 1642 near the end of the purge event, is graphically illustrated as the cross-hatched area REGION I in FIG. 24. When the controller 1614 determines at step 22720 that the first excess fuel measure XS_FUEL_1 exceeds a predetermined excess fuel threshold XS_FUEL_REF, the trap 1636 is deemed to have been substantially "purged" of stored $NO_x$, and the controller 1614 discontinues the rich (purging) operating condition at step 22722 by resetting the purge flag PRG_FLG to logical zero. The controller 1614 further initializes a post-purge-event excess fuel determination by setting a suitable flag XS_FUEL_2_CALC to logical one.

Returning to steps 22710 and 22724 of FIG. 22, when the controller 1614 determines that the purge flag PRG_FLG is not equal to logical one and, further, that the post-purge-event excess fuel determination flag XS_FUEL_2_CALC is set to logical one, the controller 1614 begins to determine the amount of additional excess fuel already delivered to (and still remaining in) the exhaust system 1632 upstream of the trap 1636 as of the time that the purge event is discontinued. Specifically, at step 22726, the controller 1614 starts determining a second excess fuel measure XS_FUEL_2 by summing the product of the difference XS_FUEL_RATE_STOICH by which the first output signal SIGNAL1 is rich of stoichiometry, and summing the product of the difference XS_FUEL_RATE_STOICH and the mass air flow rate AM. The controller 1614 continues to sum the difference XS_FUEL_RATE_STOICH until the first output signal SIGNAL1 from the $NO_x$ sensor 1640 indicates a stoichiometric value, at step 22730 of FIG. 22, at which point the controller 1614 resets the post-purge-event excess fuel determination flag XS_FUEL_2_CALC to logical zero. The resulting second excess fuel measure value XS_FUEL_2, representing the amount of excess fuel exiting the tailpipe 1642 after the purge event is discontinued, is graphically illustrated as the cross-hatched area REGION II in FIG. 24. Preferably, the second excess fuel value XS_FUEL_2 in the KAM as a function of engine speed and load, for subsequent use by the controller 1614 in optimizing the purge event.

The exemplary system 1610 also periodically determines a measure NOX_CAP representing the nominal $NO_x$- storage capacity of the trap 1636. In accordance with a first method, graphically illustrated in FIG. 25, the controller 1614 compares the instantaneous trap efficiency $\eta_{inst}$, as determined at step 21612 of FIG. 21, to the predetermined reference efficiency value $\eta_{ref}$. While any appropriate reference efficiency value $\eta_{ref}$ is used, in the exemplary system 1610, the reference efficiency value $\eta_{ref}$ is set to a value significantly greater than the minimum efficiency threshold $\eta_{min}$. By way of example only, in the exemplary system 1610, the reference efficiency value $\eta_{ref}$ is set to a value of about 0.65.

Figure 25:
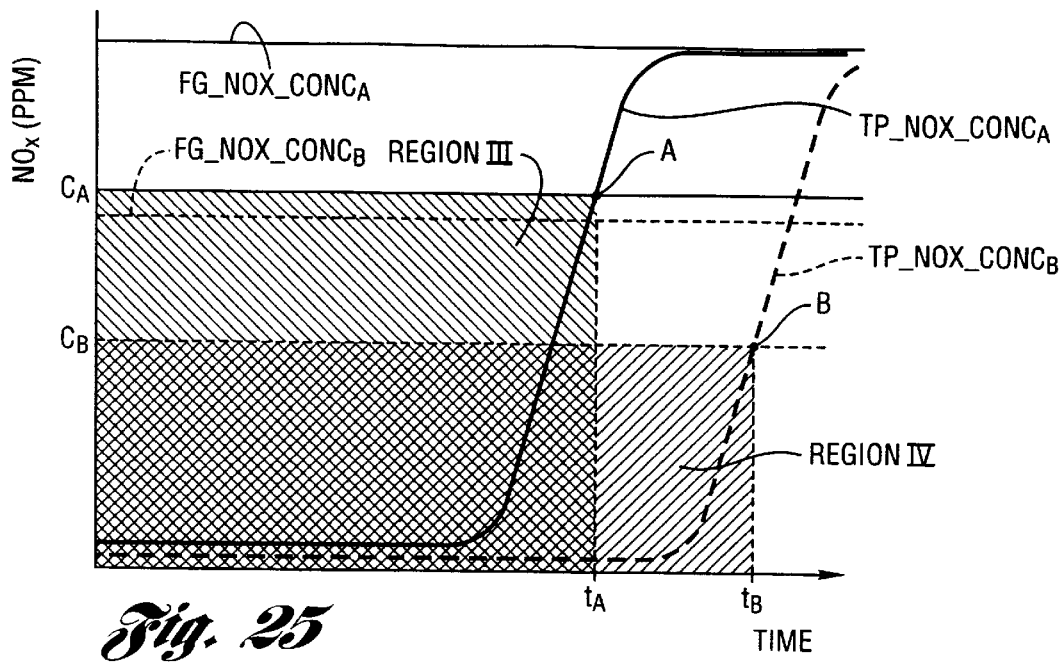
FIG. 25 is a plot illustrating feedgas and tailpipe NOx rates during a trap-filling lean engine operating condition, for both dry and high-relative-humidity conditions.

When the controller 1614 first determines that the instantaneous trap efficiency $\eta_{inst}$ has fallen below the reference efficiency value $\eta_{ref}$, the controller 1614 immediately initiates a purge event, even though the current value for the modified tailpipe emissions measure NOX_CUR, as determined in step 17222 of FIG. 17, likely has not yet exceeded the maximum emissions level NOX_MAX. Significantly, as seen in FIG. 25, because the instantaneous efficiency measure $\eta_{inst}$ inherently reflects the impact of humidity on feedgas $NO_x$ generation, the exemplary system 1610 automatically adjusts the capacity-determining "short-fill" times $t_A$ and $t_B$ at which respective dry and relatively-high-humidity engine operation exceed their respective "trigger" concentrations $C_A$ and $C_B$. The controller 1614 then determines the first excess (purging) fuel value XS_FUEL_1 using the closed-loop purge event optimizing process described above.

Figure 26:
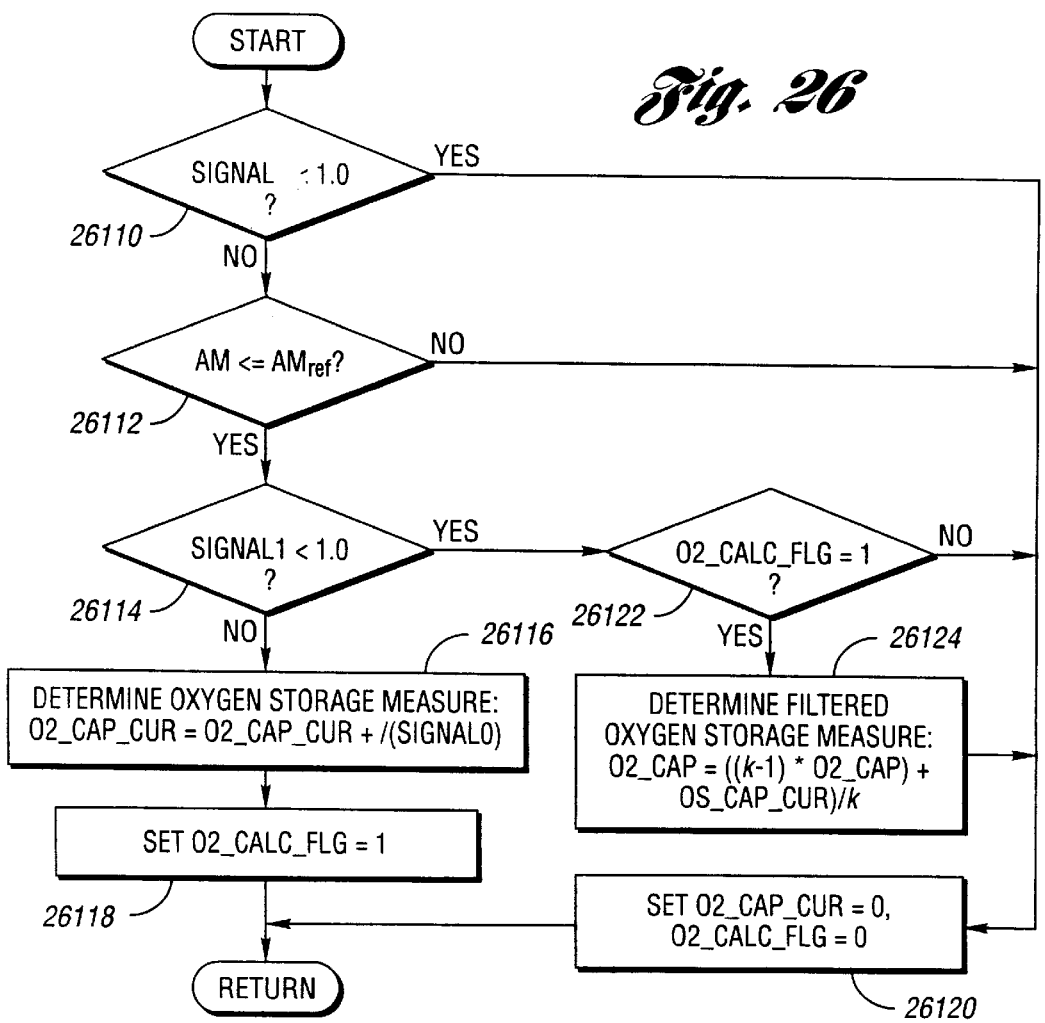
FIG. 26 is a flow chart depicting an exemplary method for determining the nominal oxygen storage capacity of the trap.

Because the purge event effects a release of both stored Nox and stored oxygen from the trap 1636, the controller 1614 determines a current $NO_x$-storage capacity measure NOX_CAP_CUR as the difference between the determined first excess (purging) fuel value XS_FUEL_1 and a filtered measure O2_CAP representing the nominal oxygen storage capacity of the trap 1636. While the oxygen storage capacity measure O2_CAP is determined by the controller 1614 in any suitable manner, in the exemplary system 1610, the oxygen storage capacity measure O2_CAP is determined by the controller 1614 immediately after a complete-cycle purge event, as illustrated in FIG. 26.

Specifically, during lean-burn operation immediately following a complete-cycle purge event, the controller 1614 determines at step 26110 whether the air-fuel ratio of the exhaust gas air-fuel mixture upstream of the trap 1636, as indicated by the output signal SIGNAL0 generated by the upstream oxygen sensor 1638, is lean of stoichiometry. The controller 1614 thereafter confirms, at step 26112, that the air mass value AM, representing the current air charge being inducted into the cylinders 1618, is less than a reference value AMref, thereby indicating a relatively-low space velocity under which certain time delays or lags due, for example, to the exhaust system piping fuel system are de-emphasized. The reference air mass value $AM_{ref}$ is preferably selected as a relative percentage of the maximum air mass value for the engine 1612, itself typically expressed in terms of maximum air charge at STP. In the exemplary system 1610, the reference air mass value $AM_{ref}$ is no greater than about twenty percent of the maximum air charge at STP and, most preferably, is no greater than about fifteen percent of the maximum air charge at STP.

If the controller 1614 determines that the current air mass value is no greater than the reference air mass value $AM_{ref}$, at step 26114, the controller 1614 determines whether the downstream exhaust gas is still at stoichiometry, using the first output signal SIGNAL1 generated by the $NO_x$ sensor 1640. If so, the trap 1636 is still storing oxygen, and the controller 1614 accumulates a measure O2_CAP_CUR representing the current oxygen storage capacity of the trap 1636 using either the oxygen content signal SIGNAL0 generated by the upstream oxygen sensor 38, as illustrated in step 26116 of FIG. 26, or, alternatively, from the injector pulse-width, which provides a measure of the fuel injected into each cylinder 1618, in combination with the current air mass value AM. At step 26118, the controller 1614 sets a suitable flag O2_CALC_FLG to logical one to indicate that an oxygen storage determination is ongoing.

The current oxygen storage capacity measure O2_CAP_CUR is accumulated until the downstream oxygen content signal SIGNAL1 from the $NO_x$ sensor 1640 goes lean of stoichiometry, thereby indicating that the trap 1636 has effectively been saturated with oxygen. To the extent that either the upstream oxygen content goes to stoichiometry or rich-of-stoichiometry (as determined at step 26110), or the current air mass value AM rises above the reference air mass value $AM_{ref}$ (as determined at step 26112), before the downstream exhaust gas "goes lean" (as determined at step 26114), the accumulated measure O2_CAP_CUR and the determination flag O2_CALC_FLG are each reset to zero at step 26120. In this manner, only uninterrupted, relatively-low-space-velocity "oxygen fills" are included in any filtered value for the trap's oxygen storage capacity.

To the extent that the controller 1614 determines, at steps 26114 and 26122, that the downstream oxygen content has "gone lean" following a suitable relatively-low-space-velocity oxygen fill, i.e., with the capacity determination flag O2_CALC_FLG equal to logical one, at step 1124, the controller 1614 determines the filtered oxygen storage measure O2_CAP using, for example, a rolling average of the last k current values O2_CAP_CUR.

Returning to FIG. 25, because the purge event is triggered as a function of the instantaneous trap efficiency measure $\eta_{inst}$, and because the resulting current capacity measure NOX_CAP_CUR is directly related to the amount of purge fuel needed to release the stored $NO_x$ from the trap 1636 (illustrated as REGIONS III and IV on FIG. 25 corresponding to dry and high-humidity conditions, respectively, less the amount of purge fuel attributed to release of stored oxygen), a relatively repeatable measure NOX_CAP_CUR is obtained which is likewise relatively immune to changes in ambient humidity. The controller 1614 then calculates the nominal $NO_x$-storage capacity measure NOX_CAP based upon the last m values for the current capacity measure NOX_CAP_CUR, for example, calculated as a rolling average value.

Alternatively, the controller 1614 determines the current trap capacity measure NOX_CAP_CUR based on the difference between accumulated measures representing feedgas and tailpipe $NO_x$ at the point in time when the instantaneous trap efficiency $\eta_{inst}$ first falls below the reference efficiency threshold $\eta_{ref}$. Specifically, at the moment the instantaneous trap efficiency $\eta_{inst}$ first falls below the reference efficiency threshold $\eta_{ref}$, the controller 1614 determines the current trap capacity measure NOX_CAP_CUR as the difference between the modified total feedgas $NO_x$ measure FG_NOX_TOT_MOD (determined at step 21616 of FIG. 21) and the total tailpipe $NO_x$ measure TP_NOX_TOT (determined at step 17218 of FIG. 17). Significantly, because the reference efficiency threshold $\eta_{ref}$ is preferably significantly greater than the minimum efficiency threshold $\eta_{min}$, the controller 1614 advantageously need not immediately disable or discontinue lean engine operation when determining the current trap capacity measure NOX_CAP_CUR using the alternative method. It will also be appreciated that the oxygen storage capacity measure O2_CAP, standing alone, is useful in characterizing the overall performance or "ability" of the $NO_x$ trap to reduce vehicle emissions.

The controller 1614 advantageously evaluates the likely continued vehicle emissions performance during lean engine operation as a function of one of the trap efficiency measures $\eta_{inst}$, $\eta_{cur}$ or $\eta_{ave}$, and the vehicle activity measure ACTIVITY. Specifically, if the controller 1614 determines that the vehicle's overall emissions performance would be substantively improved by immediately purging the trap 1636 of stored $NO_x$, the controller 1614 discontinues lean operation and initiates a purge event. In this manner, the controller 1614 operates to discontinue a lean engine operating condition, and initiates a purge event, before the modified emissions measure NOX_CUR exceeds the modified emissions threshold NOX_MAX. Similarly, to the extent that the controller 1614 has disabled lean engine operation due, for example, to a low trap operating temperature, the controller 1614 will delay the scheduling of any purge event until such time as the controller 1614 has determined that lean engine operation may be beneficially resumed.

Significantly, because the controller 1614 conditions lean engine operation on a positive performance impact and emissions compliance, rather than merely as a function of $NO_x$ stored in the trap 1636, the exemplary system 1610 is able to advantageously secure significant fuel economy gains from such lean engine operation without compromising vehicle emissions standards.

Although several examples of embodiments which practice the invention have been described herein, there are numerous other examples which could also be described. The invention is therefore to be defined only in accordance with the following claims.

We claim:

1. A method for controlling an engine coupled to an emission control device susceptible to reversible contamination, the emission control device capable of storing and releasing an emission substance, the engine capable of lean of stoichiometry, the method comprising;

determining a present fuel savings of operating the engine at a first operating condition where the engine is operated with a lean air-fuel ratio and wherein the emission control operates at its present condition;

determining a potential fuel savings of operating the engine at said first operating condition where the engine is operated with said lean air-fuel ratio and wherein the emission control operates at a decontaminated condition; and determining a fuel loss of performing a decontamination cycle; and performing said decontamination cycle in response to at least said present fuel savings, said potential fuel savings, and said fuel loss.

2. The method recited in claim 1 wherein performing comprises enabling said decontamination cycle when a difference between the potential fuel savings and the current fuel savings is greater than said fuel loss.

3. The method recited in claim 1 wherein said decontamination cycle comprises operating the engine at a substantially stoichiometric air-fuel ratio or at a rich air-fuel ratio while temperature of the emission control device is elevated.

4. The method recited in claim 3 wherein the reversible contamination includes sulfur.

5. A method for controlling an engine coupled to an emission control device susceptible to sulfur contamination, the engine capable of operating at a first operating condition and a second operating condition, the method comprising;

determining a fuel economy impact of operating the engine at the first operating condition compared to operating the engine at the second operating condition, said fuel economy impact including a benefit provided by lean operation and a penalty incurred by performing a sulfur decontamination cycle; and initiating a sulfur decontamination cycle in response to at least said fuel economy impact, wherein said sulfur decontamination cycle reduces the sulfur contamination.

6. The method recited in claim 5 further comprising:

calculating a capacity of the emission control device, wherein said performing further includes enabling said decontamination cycle based at least on said fuel economy impact and said capacity.

7. The method recited in claim 5 wherein said fuel economy impact is an engine efficiency impact.

8. The method recited in claim 5 wherein said fuel economy impact is a fuel savings.

9. The method recited in claim 5 wherein the first operating condition represents operating the engine lean of stoichiometry and the second operating condition represents operating the engine substantially at stoichiometry.

10. The method recited in claim 5 wherein said fuel economy benefit is a benefit of operating the engine lean of stoichiometry with a decontaminated emission control device compared to operating the engine substantially at stoichiometry.

11. The method recited in claim 5 wherein said benefit is a difference between a first benefit of operating the engine lean of stoichiometry with a decontaminated emission control device compared to operating the engine substantially at stoichiometry and a second benefit of operating the engine lean of stoichiometry with a contaminated emission control device compared to operating the engine substantially at stoichiometry.

12. The method recited in claim 5 wherein said fuel economy impact comprises a fuel economy impact of operating the engine lean of stoichiometry compared to operating the engine substantially at stoichiometry.

13. The method recited in claim 12 wherein said fuel economy impact comprises a first impact of operating lean while the emission control device is absorbing NOx and a second impact of operating rich of stoichiometry to purge absorbed NOx.

14. The method recited in claim 13 wherein said first impact represents a fuel savings compared to operating the engine substantially at stoichiometry and said second impact represents a fuel loss compared to operating the engine substantially at stoichiometry.

15. The method recited in claim 14 wherein said fuel economy impact is based on said fuel savings and said fuel loss.

16. The method recited in claim 5 wherein said penalty is determined based on a previously executed decontamination cycle.

17. The method recited in claim 5 wherein said benefit is a fuel economy benefit averaged over an interval, said interval comprising a first interval where the engine is operated lean of stoichiometry and a second interval where the engine is operated substantially at or rich of stoichiometry for a second period.

18. The method recited in claim 17 wherein said fuel economy benefit is further averaged over a predetermined number of said intervals.

19. The method recited in claim 16 wherein said penalty is determined based on a preselected number of averages of individual decontamination penalties.

20. The method recited in claim 5 wherein the first operating condition represents operating the engine lean of stoichiometry and the second operating condition represents operating the engine rich of stoichiometry.

21. The method recited in claim 5 wherein the first operating condition represents operating the engine lean of stoichiometry for a first interval and operating the engine rich of stoichiometry for a second interval and the second operating condition represents operating the engine rich of stoichiometry with the emission control device at an elevated temperature.

22. The method recited in claim 5 wherein the emission control device is a NOx trap.

23. A method for controlling an engine coupled to an emission control device susceptible to sulfur contamination, the engine capable of operating at a first operating condition and a second operating condition, the method comprising;

determining a fuel savings of operating the engine at the first operating condition where the engine is operated with a lean air-fuel ratio;

determining a fuel loss of reducing sulfur contamination by operating the engine at the second operating condition where temperature of the emission control device is elevated and the engine is operated at the substantially stoichiometric air-fuel ratio or at a rich air-fuel ratio, said second operating condition reducing the sulfur contamination; and enabling the second operating condition based at least on said fuel savings and said fuel loss.

24. The method recited in claim 23 wherein said fuel savings is relative to stoichiometric operating conditions.

25. The method recited in claim 24 wherein said fuel loss is relative to stoichiometric operating conditions.

26. The method recited in claim 25 wherein said enabling further comprises enabling the second operating condition when said savings is greater than said loss.

27. A method for controlling an engine of a vehicle, the engine coupled to an emission control device susceptible to reversible contamination, the engine capable of operating at a first operating condition and a second operating condition, the method comprising;

determining a fuel economy impact of operating the engine at the first operating condition compared to operating the engine at the second operating condition;

initiating a decontamination cycle in response to at least said fuel economy impact, wherein said decontamination cycle reduces the reversible contamination;

during said first operating condition, determining a set-point amount of emissions exiting the emission control device per distance traveled by the vehicle and adjusting an engine operating parameter based on said set-point.

28. The method recited in claim 27 wherein said adjusting said engine operating parameter includes adjusting said engine operating parameter based on said set-point and a measured actual amount of emissions exiting the emission control device per distance traveled by the vehicle, wherein said actual amount of emissions exiting is calculated based on a sensor coupled downstream of the emission control device, the sensor providing a first signal indicative of oxygen concentration and a second signal indicative of $NO_x$ concentration.

* * * * *